US010607120B2

(12) United States Patent
Bai et al.

(10) Patent No.: US 10,607,120 B2
(45) Date of Patent: Mar. 31, 2020

(54) TRAINING METHOD AND APPARATUS FOR CONVOLUTIONAL NEURAL NETWORK MODEL

(71) Applicant: TENCENT TECHNOLOGY (SHENZHEN) COMPANY LIMITED, Shenzhen (CN)

(72) Inventors: Xiang Bai, Shenzhen (CN); Feiyue Huang, Shenzhen (CN); Xiaowei Guo, Shenzhen (CN); Cong Yao, Shenzhen (CN); Baoguang Shi, Shenzhen (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 64 days.

(21) Appl. No.: 15/942,254

(22) Filed: Mar. 30, 2018

(65) Prior Publication Data

US 2018/0225552 A1    Aug. 9, 2018

Related U.S. Application Data

(63) Continuation of application No. 15/486,102, filed on Apr. 12, 2017, now Pat. No. 9,977,997, which is a
(Continued)

(30) Foreign Application Priority Data

Apr. 2, 2015 (CN) .......................... 2015 1 0154027

(51) Int. Cl.
*G06K 9/62* (2006.01)
*G06K 9/42* (2006.01)
*G06K 9/46* (2006.01)

(52) U.S. Cl.
CPC ............. *G06K 9/6267* (2013.01); *G06K 9/42* (2013.01); *G06K 9/4604* (2013.01); *G06K 9/627* (2013.01); *G06K 9/6256* (2013.01)

(58) Field of Classification Search
CPC ........ G06N 3/08; G06N 3/0454; G06N 3/084; G06N 99/005; B25J 9/161; B25J 9/163;
(Continued)

(56) References Cited

U.S. PATENT DOCUMENTS 9,226,047 B2 * 12/2015 Thorwirth .............. G11B 27/28
9,846,977 B1    12/2017 Cox et al.
(Continued)

FOREIGN PATENT DOCUMENTS

CN        103996056        8/2014
CN        104463172        3/2015
(Continued)

OTHER PUBLICATIONS

Notice of Allowance of Japanese Application No. 2017519841, dated Nov. 6, 2017.
(Continued)

*Primary Examiner* — Jingge Wu
(74) *Attorney, Agent, or Firm* — Oblon, McClelland, Maier & Neustadt, L.L.P.

(57) ABSTRACT

Disclosed are a training method and apparatus for a CNN model, which belong to the field of image recognition. The method comprises: performing a convolution operation, maximal pooling operation and horizontal pooling operation on training images, respectively, to obtain second feature images; determining feature vectors according to the second feature images; processing the feature vectors to obtain category probability vectors; according to the category probability vectors and an initial category, calculating a category error; based on the category error, adjusting model parameters; based on the adjusted model parameters, continuing the model parameters adjusting process, and using the model parameters when the number of iteration times reaches a pre-set number of times as the model parameters for the
(Continued)

well-trained CNN model. After the convolution operation and maximal pooling operation on the training images on each level of convolution layer, a horizontal pooling operation is performed. Since the horizontal pooling operation can extract feature images identifying image horizontal direction features from the feature images, such that the well-trained CNN model can recognize an image of any size, thus expanding the applicable range of the well-trained CNN model in image recognition.

19 Claims, 7 Drawing Sheets

Related U.S. Application Data continuation of application No. PCT/CN2016/077280, filed on Mar. 25, 2016.

(58) Field of Classification Search
CPC ............ G05B 13/027; G06K 9/00409; G06K 9/2627; G06K 9/6267; G06K 9/42; G06K 9/627; G06K 9/4604; G06K 9/4638; G06K 9/6256; G06K 9/6257; G06T 2207/20081
See application file for complete search history.

(56) References Cited

U.S. PATENT DOCUMENTS

| | | | | |
|---|---|---|---|---|
| 2006/0210195 | A1* | 9/2006 | Ohguro | G06K 9/3208 382/290 |
| 2012/0224765 | A1* | 9/2012 | Kim | G06K 9/325 382/159 |
| 2014/0363074 | A1* | 12/2014 | Dolfing | G06K 9/00979 382/156 |
| 2014/0365949 | A1* | 12/2014 | Xia | G06K 9/00436 715/780 |
| 2015/0032449 | A1 | 1/2015 | Sainath et al. | |
| 2015/0213599 | A1* | 7/2015 | Buzaglo | G06F 16/51 382/128 |
| 2015/0347860 | A1* | 12/2015 | Meier | G06K 9/72 382/140 |
| 2015/0347861 | A1* | 12/2015 | Doepke | H04N 5/23245 382/199 |
| 2016/0140424 | A1 | 5/2016 | Wang et al. | |
| 2016/0155016 | A1* | 6/2016 | Li | G06K 9/00664 382/159 |
| 2016/0171314 | A1* | 6/2016 | Shao | G06K 9/00798 382/104 |
| 2016/0259994 | A1* | 9/2016 | Ravindran | G06K 9/00 |
| 2016/0292503 | A1* | 10/2016 | Motoyama | G06T 7/73 |
| 2016/0350655 | A1* | 12/2016 | Weiss | G06N 3/088 |
| 2017/0083792 | A1 | 3/2017 | Rodriguez-Serrano et al. | |
| 2017/0140253 | A1 | 5/2017 | Wshah et al. | |
| 2017/0220879 | A1 | 8/2017 | Nakamura et al. | |
| 2017/0249339 | A1 | 8/2017 | Lester | |
| 2017/0300785 | A1 | 10/2017 | Merhav et al. | |
| 2017/0328983 | A1 | 11/2017 | Volgyesi et al. | |
| 2018/0005082 | A1 | 1/2018 | Bluche | |

FOREIGN PATENT DOCUMENTS

| | | |
|---|---|---|
| CN | 104463194 | 3/2015 |
| CN | 104463241 | 3/2015 |
| JP | 2012208597 | 10/2012 |
| JP | 2016153984 | 8/2016 |

OTHER PUBLICATIONS

Harada Tatsuya, "Chapter 2 Image comprehension by machine learning", Journal of the Institute Image Information and Television Engineers, Japan, general incorporated foundation institute of Image Information and Television Engineers, Feb. 1, 2015, vol. 69, No. 2, pp. 117-123.

Sekino Masanori, "Improved Convolutional Neural Network Character Recognition Based on Visual Information Processing Model", a Fuji Xerox Technical Report, Japan, Fuji Xerox Co. Ltd., Feb. 20, 2014, No. 23, and pp. 82-88.

English Translation of the Written Opinion of the International Search Authority in International Application No. PCT/CN2016/077280, dated Jun. 22, 2016.

International Search Report in International application No. PCT/CN2016/077280, dated Jun. 22, 2016.

\* cited by examiner

TRAINING METHOD AND APPARATUS FOR CONVOLUTIONAL NEURAL NETWORK MODEL

CROSS REFERENCE TO RELATED APPLICATIONS

This application is a continuation of U.S. Ser. No. 15/486,102 filed Apr. 12, 2017, the entire content of which is incorporated herein by reference. U.S. Ser. No. 15/486,102 is a continuation application of International Patent Application No. PCT/CN2016/077280, filed on Mar. 25, 2016, which claims priority to Chinese Patent Application No. 201510154027.0, filed on Apr. 2, 2015.

TECHNICAL FIELD

The present disclosure generally relates to the field of image recognition, and more particularly, to a method and device for training for a CNN model.

BACKGROUND

In the field of image recognition, a CNN model is usually adopted to determine a classification of an image to be recognized. Before the classification of the image to be recognized is recognized through the CNN model, the CNN model is required to be trained at first.

Training of a CNN model is usually implemented in a manner as follows. At first, model parameters of the CNN model to be trained are initialized, the model parameters including initial convolution kernels of the respective convolution layer, initial bias matrixes of the respective convolution layer, and an initial weight matrix and an initial bias vector of a fully connected layer. Then, an area to be processed with a fixed height and a fixed width is acquired from each of preselected training images, the fixed height and the fixed width being matched with a classification of an image to be recognized, which is preset, as an image that can be processed, by the CNN model to be trained. The area to be processed corresponding to each of the training images is input into the CNN model to be trained. Next, on each convolution layer, convolution operation and maximal pooling operation are performed on each area to be processed by using the initial convolution kernel and initial bias matrix of each convolution layer, to obtain a feature image of each area to be processed on each convolution layer. Then, each feature image is processed to obtain classification probability of each area to be processed by using the initial weight matrix and initial bias vector of the fully connected layer. Then, a classification error is calculated according to initial classification and the classification probability of each of the training images. A mean of the classification errors is calculated according to the classification errors of all the training images. Then, the model parameters of the CNN model to be trained are regulated by using the mean of the classification errors. Then, the abovementioned respective steps are iterated for a specified number of times by using the regulated model parameters and the respective training images. Finally, model parameters obtained when the number of iterations reaches the specified number of times are determined as the model parameters of the trained CNN model.

In a process of implementing the present disclosure, the inventor finds that a related technology at least has a problem as follows.

It is necessary to acquire the areas to be processed with the fixed height and the fixed width from the pre-selected training images in the process of training a CNN model, and accordingly the trained CNN model can only recognize an image with the fixed height and the fixed width, which may cause certain limits to image recognition of the trained CNN model and further cause a limited application range.

SUMMARY

In order to solve the problem of a conventional art, the embodiments of the present disclosure provide a method and device for training a CNN model. The technical solutions are implemented as follows.

In a first aspect, a method for training a CNN model is provided, which may include:

initial model parameters of a CNN model to be trained are acquired, the initial model parameters including initial convolution kernels and initial bias matrixes of convolution layers of respective levels, and an initial weight matrix and an initial bias vector of a fully connected layer;

a plurality of training images are acquired;

on the convolution layer of each level, convolution operation and maximal pooling operation are performed on each of the training images to obtain a first feature image of each of the training images on the convolution layer of each level by using the initial convolution kernel and initial bias matrix of the convolution layer of each level;

horizontal pooling operation is performed on the first feature image of each of the training images on the convolution layer of at least one of the levels to obtain a second feature image of each of the training images on the convolution layer of each level;

a feature vector of each of the training images are determined according to the second feature image of each of the training images on the convolution layer of each level;

each feature vector is processed to obtain a classification probability vector of each of the training images according to the initial weight matrixes and the initial bias vectors;

a classification error is calculated according to the classification probability vector and initial classification of each of the training images;

the model parameters of the CNN model to be trained are regulated on the basis of the classification errors;

on the basis of the regulated model parameters and the plurality of training images, the process of regulating the model parameters is continued until the number of iterations reaches a preset number; and model parameters obtained when the number of iterations reaches the preset number are determined as the model parameters of the trained CNN model.

In a second aspect, a device for training a CNN model is provided, which may include:

a first acquisition module configured to acquire initial model parameters of a CNN model to be trained, the initial model parameters including initial convolution kernels and initial bias matrixes of convolution layers of respective levels, and an initial weight matrix and an initial bias vector of a fully connected layer;

a second acquisition module configured to acquire a plurality of training images;

a feature extraction module configured to, on the convolution layer of each level, perform convolution operation and maximal pooling operation on each of the training images to obtain a first feature image of each of the training images on the convolution layer of each level by using the initial convolution kernel and initial bias matrix of the convolution layer of each level;

a horizontal pooling module configured to perform horizontal pooling operation on the first feature image of each of the training images on the convolution layer of at least one of the levels to obtain a second feature image of each of the training images on the convolution layer of each level;

a first determination module configured to determine a feature vector of each of the training images according to the second feature image of each of the training images on the convolution layer of each level;

a processing module configured to process each feature vector to obtain a classification probability vector of each of the training images according to the initial weight matrixes and the initial bias vectors;

a calculation module configured to calculate a classification error according to the classification probability vector and initial classification of each of the training images;

a regulation module configured to regulate the model parameters of the CNN model to be trained on the basis of the classification errors;

an iteration module configured to, on the basis of the regulated model parameters and the plurality of training images, continue the process of regulating the model parameters until the number of iterations reaches a preset number; and a second determination module configured to determine model parameters obtained when the number of iterations reaches the preset number as the model parameters of the trained CNN model.

In a third aspect, a server is provided, which may include:
one or more processors, and
a memory connected with the one or more processors, the memory being configured to store instructions executable for the one or more processors,
wherein the one or more processors may be configured to execute the instructions stored by the memory to perform the method for training the CNN model provided on the first aspect.

The technical solutions provided by the embodiments of the present disclosure can achieve the following beneficial effects.

After the convolution operation and the maximal cooling operation are performed on the training images on the convolution layer of each level, the horizontal pooling operation is further performed on the feature images obtained by the maximal cooling operation. During the horizontal cooling operation, the feature images which identify features of the feature images in a horizontal direction may further be extracted from the feature images to ensure that the trained CNN model may break limits of a size of an image to be recognized in the horizontal direction during image classification recognition and recognize an image to be recognized with any size, so that an image recognition application range of the CNN model trained in such a manner is relatively wider.

BRIEF DESCRIPTION OF THE DRAWINGS

In order to describe the technical solutions in the embodiments of the present disclosure more clearly, the accompanying drawings which are required by description about the embodiments will be simply introduced below. Apparently, the accompanying drawings described below are only some embodiments of the present disclosure, and those skilled in the art may further obtain other accompanying drawings according to these accompanying drawings without creative work.

DETAILED DESCRIPTION

In order to make a purpose, technical solutions and advantages of the present disclosure clearer, implementations of the present disclosure will be further described in detail below with reference to the accompanying drawings.

Figure 1:
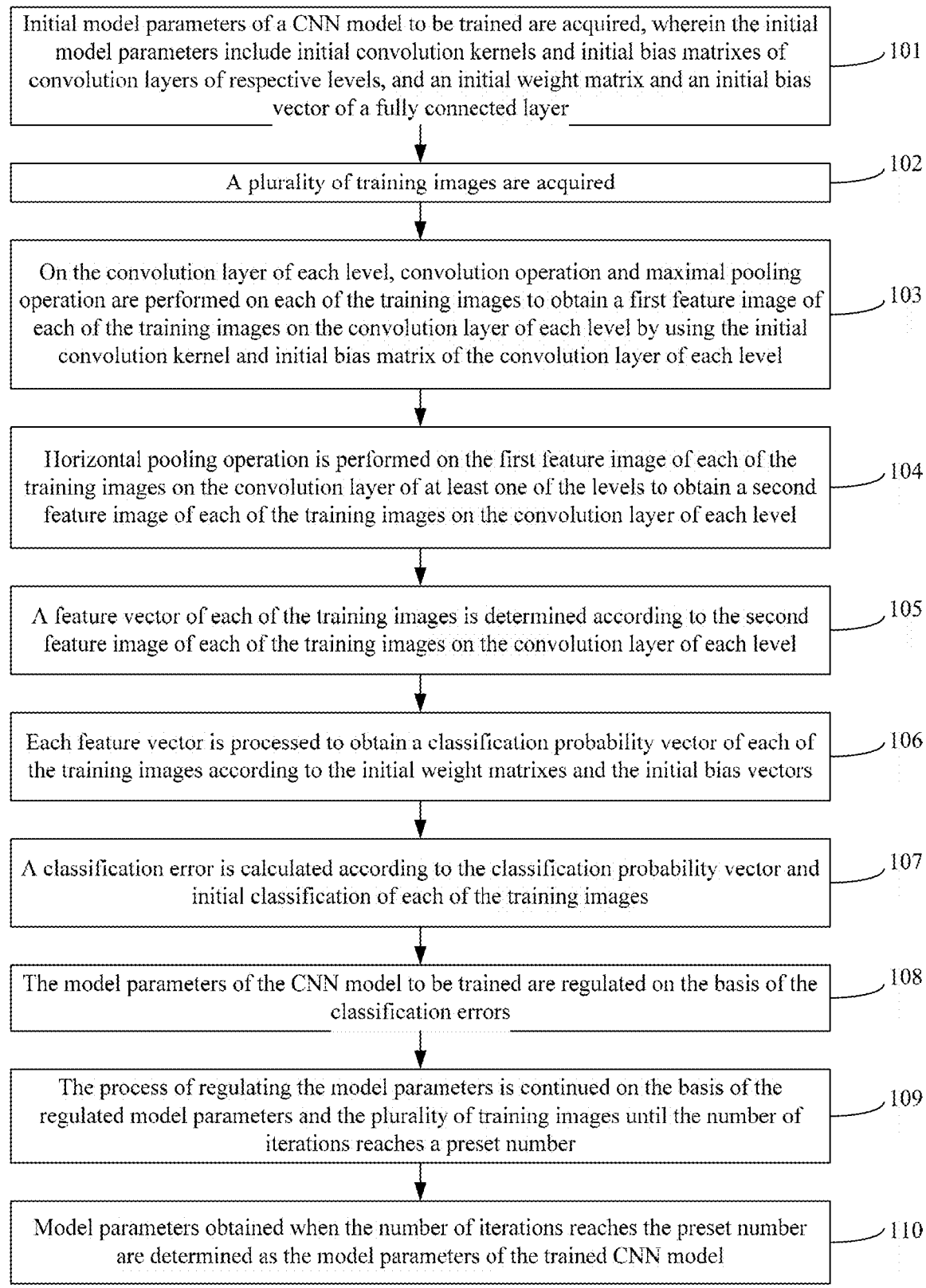
FIG. 1 is a flow chart showing a method for training a CNN model, according to an embodiment of the present disclosure.

FIG. 1 is a flow chart showing a method for training a CNN model, according to an embodiment of the present disclosure. As shown in FIG. 1, a flow of the method provided by the embodiments of the present disclosure includes the following steps.

In Step 101, initial model parameters of a CNN model to be trained are acquired, wherein the initial model parameters include initial convolution kernels and initial bias matrixes of convolution layers of respective levels, and an initial weight matrix and an initial bias vector of a fully connected layer.

In Step 102, a plurality of training images are acquired.

In another embodiment, the step that the plurality of training images are acquired includes:
a plurality of initial training images are acquired;
for each of the initial training images, a width-height ratio of the initial training image is kept, and the initial training image is processed to obtain a first image with a specified height; and
the first image is processed to obtain a second image with a specified width, and the image with the specified height and the specified width is determined as the training images corresponding to the initial training image.

In another embodiment, the step that the first image is processed to obtain the second image with the specified width includes:
when width of the first image is smaller than the specified width, left and right sides of the first image are uniformly filled with pixels having a specified gray-scale value, and the second image is obtained when the width of the first image reaches the specified width; and
when the width of the first image is larger than the specified width, pixels on the left and right sides of the first image are uniformly cropped, and the second image is obtained when the width of the first image reaches the specified width.

In another embodiment, the step that the plurality of training images are acquired includes:

a plurality of initial training images are acquired; and for each of the initial training images, a width-height ratio of the initial training image is kept, the initial training image is processed to obtain an image with a specified height, and a width corresponding to the specified height is determined as width of the initial training image.

In another embodiment, the training images are images in a natural scene, the images in the natural scene include characters in different languages, and the CNN model to be trained is a language recognition classifier.

In Step 103, on the convolution layer of each level, convolution operation and maximal pooling operation are performed on each of the training images to obtain a first feature image of each of the training images on the convolution layer of each level by using the initial convolution kernel and initial bias matrix of the convolution layer of each level.

In another embodiment, the step that the convolution operation and the maximal pooling operation are performed on each of the training images to obtain the first feature image of each of the training images on the convolution layer of each level by using the initial convolution kernel and initial bias matrix on the convolution layer of each level includes:

for each of the training images, the first feature image on the convolution layer of a previous level is input to a current convolution layer, and the convolution operation is performed on the first feature image on the convolution layer of the previous level to obtain a convolutional image on the current convolution layer by using the initial convolution kernel and initial bias matrix of the current convolution layer, wherein the first feature image on the convolution layer of the previous level is the training image if the current convolution layer is the convolution layer of the first level; and after the maximal pooling operation is performed on the convolutional image on the current convolution layer to obtain the first feature image of the training image on the current convolution layer, the first feature image on the current convolution layer is continuously transmitted to the convolution layer of a next level, and the convolution operation and the maximal pooling operation are performed on the convolution layer of the next level until the convolution operation and the maximal pooling operation are performed on the convolution layer of a last level to obtain the first feature image on the convolution layer of the last level.

In Step 104, horizontal pooling operation is performed on the first feature image of each of the training images on the convolution layer of at least one of the levels to obtain a second feature image of each of the training images on the convolution layer of each level.

In another embodiment, the step that the horizontal pooling operation is performed on the first feature image of each of the training images on the convolution layer of at least one of the levels to obtain the second feature image of each of the training images on the convolution layer of each level includes:

for the first feature image of each training image on the convolution layer of each level, a maximum value of elements of each of rows of each of the images in the first feature image on the convolution layer is extracted, wherein the first feature image includes a preset number of images, and the preset number is the same as each of the numbers of the convolution kernels and bias matrixes of the convolution layer;

the maximum values extracted from all the rows of each image are arranged into a one-dimensional vector according to arrangement of pixels of each image; and the one-dimensional vectors of all the images in the first feature image on the convolution layer are combined to obtain the second feature image on the convolution layer.

In Step 105, a feature vector of each of the training images is determined according to the second feature image of each of the training images on the convolution layer of each level.

In another embodiment, the step that the feature vector of each of the training images is determined according to the second feature image of each of the training images on the convolution layer of each level includes:

for each of the training images, elements of all rows of the second feature image of the training image on the convolution layer of each level are connected head to tail to obtain the feature vector of the training image.

In Step 106, each feature vector is processed to obtain a classification probability vector of each of the training images according to the initial weight matrixes and the initial bias vectors.

In Step 107, a classification error is calculated according to the classification probability vector and initial classification of each of the training images.

In another embodiment, the step that the classification error is calculated according to the classification probability vector and initial classification of each of the training images includes:

the initial classification of each of the training images are acquired;

the classification error of each of the training images is calculated according to the classification probability vector and initial classification of each of the training images by using the following formula:

$$Loss = -Lny_{label},$$

where Loss represents the classification error of each of the training images, label represents the initial classification of each of the training images, $y_i$ represents a element of the classification probability vector of each of the training images, and $y_{label}$ represents a classification probability corresponding to the initial classification; and the mean of the classification errors of all the training images is calculated, and the mean of the classification errors is determined as a classification error.

In Step 108, the model parameters of the CNN model to be trained are regulated on the basis of the classification errors.

In Step 109, on the basis of the regulated model parameters and the plurality of training images, the process of regulating the model parameters is continued until the number of iterations reaches a preset number.

In Step 110, model parameters obtained when the number of iterations reaches the preset number are determined as the model parameters of the trained CNN model.

According to the method provided by the embodiments of the present disclosure, after the convolution operation and the maximal pooling operation are performed on the training images on the convolution layer of each level, the horizontal pooling operation is further performed on the feature images obtained by the maximal cooling operation. During the horizontal cooling operation, the feature images which identify the features of the feature images in a horizontal direction may further be extracted from the feature images to ensure that the trained CNN model may break limits of a size of an image to be recognized in the horizontal direction during image classification identification and recognize an image to be recognized with any size, so that an image recognition application range of the CNN model trained in such a manner is relatively wider.

In another embodiment, the CNN model to be trained includes four levels of convolution layers and two fully connected layers, and the convolution layers of the respective levels include the same or different numbers of convolution kernels and bias matrixes.

The step that the horizontal pooling operation is performed on the first feature image of each of the training images on the convolution layer of at least one of the levels to obtain the second feature image of each of the training images on the convolution layer of each level includes:

the horizontal pooling operation is performed on the first feature image of each of the training images on the convolution layer of a second level, the first feature image of each of the training images on the convolution layer of a third level and the first feature image of each of the training images on the convolution layer of a fourth level to obtain the second feature image of each of the training images on the convolution layer of the second level, the second feature image of each of the training images on the convolution layer of the third level and the second feature image of each of the training images on the convolution layer of the fourth level, respectively.

The step that the feature vector of each of the training images is determined according to the second feature image of each of the training images on the convolution layer of each level includes:

for each of the training images, the feature vector of the training image is determined according to the second feature image of the training image on the convolution layer of the second level, the second feature image of the training image on the convolution layer of the third level and the second feature image of the training image on the convolution layer of the fourth level.

All of the optional technical solutions may be freely combined into optional embodiments of the present disclosure, which will not be elaborated one by one.

Figure 2:
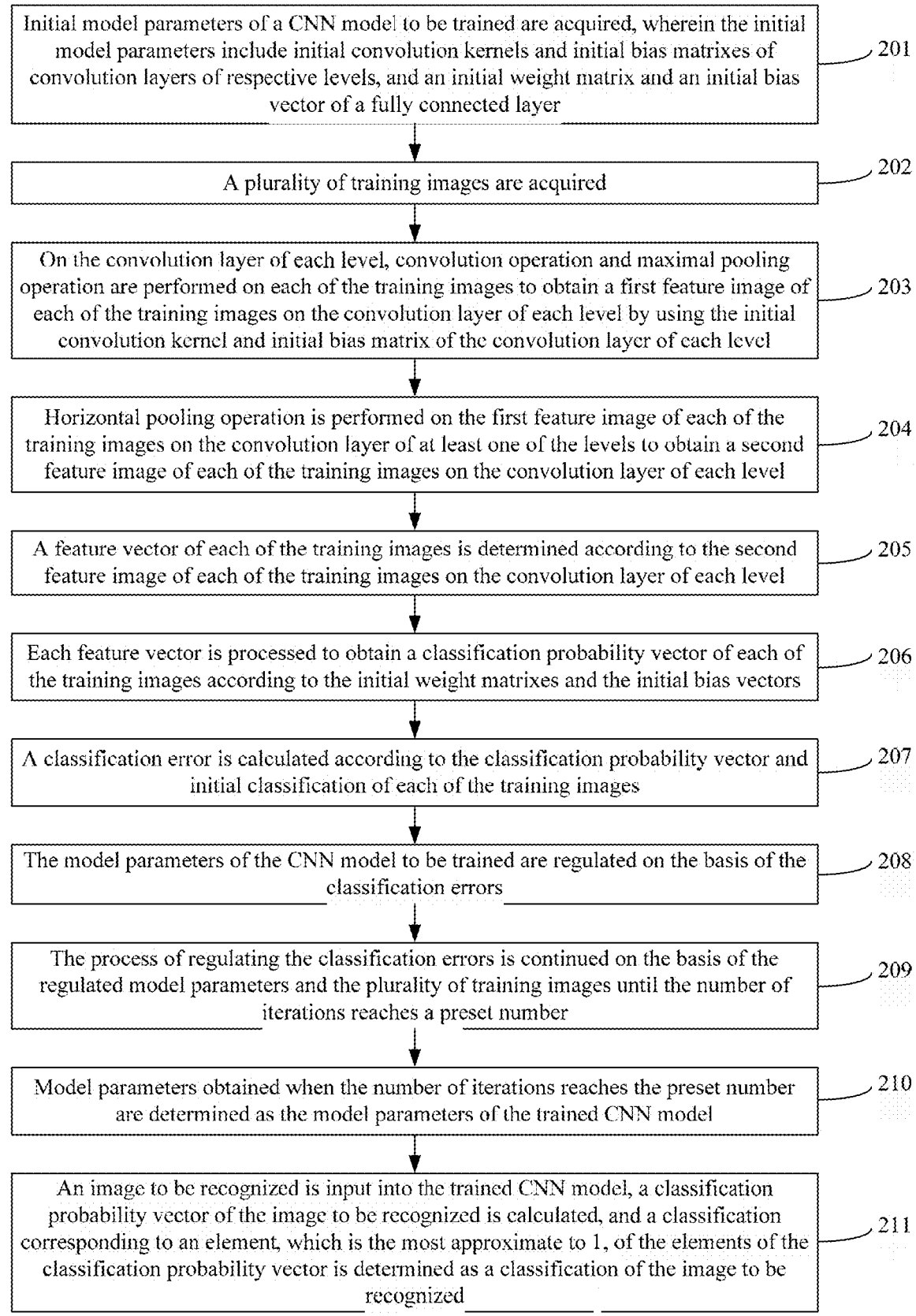
FIG. 2 is a flow chart showing a method for training a CNN model, according to another embodiment of the present disclosure.

With reference to a content of the embodiment corresponding to FIG. 1, FIG. 2 is a flow chart showing a method for training a CNN model, according to another embodiment of the present disclosure. As shown in FIG. 2, a flow of the method provided by the embodiment of the present disclosure includes the following steps:

In Step 201, initial model parameters of a CNN model to be trained are acquired, wherein the initial model parameters include initial convolution kernels and initial bias matrixes of convolution layers of respective levels, and an initial weight matrix and an initial bias vector of a fully connected layer.

Specifically, a process of training the CNN model is a process of determining model parameters of the CNN model to be trained. When the model parameters is determined, the initial model parameters may be initialized for the CNN model to be trained. The initial model parameters are continuously optimized in a subsequent training process. And an optimal model parameters obtained by optimization are determined as the model parameters of the trained CNN model. Therefore, when the CNN model to be trained is trained, it is necessary to acquire the initial model parameters of the CNN model to be trained at first.

In the case, the CNN model to be trained usually includes at least two levels of convolution layers and at least one level of fully connected layer, the convolution layer of each level includes a plurality of convolution kernels and a plurality of bias matrixes, and each level of fully connected layer includes a plurality of weight matrixes and a plurality of bias vectors. Therefore, the acquired model parameters include the initial convolution kernels of the convolution layer of each level, the initial bias matrixes of the convolution layer of each level, the initial weight matrix of the fully connected layer and the initial bias vector of the fully connected layer.

Figure 3:
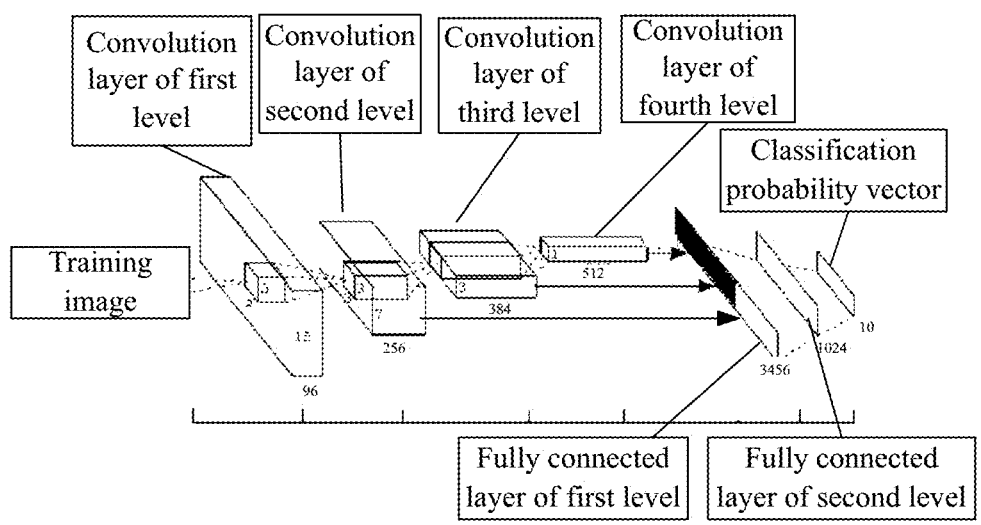
FIG. 3 is a schematic diagram illustrating a CNN model to be trained, according to another embodiment of the present disclosure.

The number of the convolution layers and the number of the fully connected layers of the CNN model to be trained are not specifically limited in the embodiment of the present disclosure, and may be set according to a requirement during specific implementation. For example, FIG. 3 shows a schematic diagram illustrating a CNN model to be trained. The CNN model to be trained shown in FIG. 3 includes four levels of convolution layers and two levels of fully connected layers.

Furthermore, the number of the convolution kernels and the number of the bias matrixes of the convolution layer of each level and the numbers of the weight matrixes and bias vectors of each level of fully connected layer are not specifically limited in the embodiment of the present disclosure. In addition, dimensions of each convolution kernel and bias matrix and dimensions of each weight matrix and each bias vector are also not limited in the embodiment of the present disclosure. During specific implementation, the numbers and dimensions of the convolution kernels and bias matrixes of the convolution layer of each level and the numbers and dimensions of the weight matrixes and bias vectors of each level of fully connected layer may all adopt empirical values.

For example, the convolution layer of the first level may include 96 convolution kernels $C^1$ with sizes of 5×5, $C^1 = \{C_i^1\}_{i=1}^{96}$, and 96 bias matrixes $B^1$ with sizes of 5×5, $B^1 = \{B_i^1\}_{i=1}^{96}$.

With reference to the abovementioned content, when the initial model parameters of the CNN model to be trained are acquired, a value may be randomly selected from a specified numerical value range as a value of each of the elements in the initial model parameters. For example, for each of the elements in each initial convolution kernel, initial weight matrix, initial bias matrix and initial bias vector, a random number may be selected from interval [−r, r]. Here, r is a threshold value of the initial model parameter, and it may be an empirical value. For example, r may be 0.001.

In step 202, a plurality of training images are acquired.

The classifications of the training images are related to the type of the recognition of the CNN model to be trained. For example, when the CNN model to be trained is a model capable of recognizing different languages, the training images may be images including characters or character strings in different languages. When the CNN model to be trained is a model which recognizes colors, the training images are images including different colors and the like.

Optionally, with continuous development of a global economic situation, transnational communication and cooperation frequencies of nations, enterprises and persons greatly increase. In such case, a person may usually encounter various places where multilingual information is required to be used or understood inevitably, such as ordering at an exotic restaurant, participation in an international conference and browsing of a foreign website. This means that a technology for processing and understanding multilingual information has become a very important and urgent need. Specifically, such a technology requires automatic recognition of a language classification of a word obtained from a complicated natural scene. The recognition of a language classification of a word in a natural scene is a very tough challenge. There exist some major difficulties. One difficulty lies in that a font, color and layout manner of word information in the natural scene are usually messy, and its background is more complicated and may include more noise information. Another difficulty lies in that alphabets of different languages may include some characters which are completely the same or highly similar, and for example, there are some characters with the same shapes in English and Russian. Thus, it is difficult to recognize a language classification only from appearances of words. The last difficulty lies in that many classifiers for pictures with fixed width-height ratios become inapplicable to word pictures with completely inconsistent width-height ratios in the natural scene.

With reference to the abovementioned content, a CNN model capable of recognizing an image including characters in different languages in a natural scene is disclosed, and may implement rapid recognition of the language classifications of the characters in the image in the natural scene. Therefore, in the embodiment of the present disclosure, the training images may be images in the natural scene, and the images in the natural scene include characters in different languages. On such a basis, the CNN model to be trained may be a language recognition classifier.

In addition, sizes of the training images are not specifically limited in the embodiment of the present disclosure, and may be determined with reference to classifications of the training images during specific implementation. For example, an image including characters in different languages in the natural scene is usually greatly different in a horizontal direction and relatively similar in a vertical direction. That is, features of such an image are usually reflected in the horizontal direction. Therefore, in the embodiment of the present disclosure, for each of the training images, a specific value of its height may be limited, while the value of its width is not limited.

Specifically, in the embodiment of the present disclosure, all the training images may have the same height and width, that is, all the training images have a specified height and a specified width. In addition, all the training images may have the same height but different widths. For example, all the training images have the specified height but different widths. The specified height is a first number of pixels, and the specified width is a second number of pixels. Specifically, the first number may be an empirical value, and for example, the first number may be 32. The second number may be a random number selected within a preset range. In addition, a value of the second number may be related to classification of the image. For example, characters of the image including the characters in different languages in the natural scene are usually distributed in the horizontal direction, so that its width is usually larger than the height, and on such a basis, the first number is usually smaller than the second number. From the content of this part, the preset range may be from 48 to 256.

With reference to the size classifications of the training images, when the plurality of training images are acquired, the following two manners are adopted without limitation.

In the first manner, all the training images have a specified height and a specified width.

In such a manner, a plurality of initial training images may be acquired at first, and for each of the plurality of initial training images, a width-height ratio of the initial training image may be kept, and the initial training image is processed into a first image with the specified height; and then, the first image is processed into a second image with the specified width. At this moment, a training image which corresponds to the initial training image and has the specified height and the specified width may be obtained. All of the initial training images are processed in the same manner, and then the plurality of training images may be obtained.

For example, for a certain initial training image with a size of 64 pixels*120 pixels, when the specified height includes 32 pixels, the initial training image may be processed to obtain a training image with a size of 32 pixels*60 pixels.

In such a manner, when the first image is processed to obtain the second image with the specified width, since width of the first image may be larger than the specified width, and may also be smaller than the specified width. For the two cases, there may exist the following two processing manner for obtaining the image with the specified width.

In the first case where the width of the first image is smaller than the specified width, left and right sides of the first image are uniformly filled with pixels having a specified gray-scale value until the width of the first image reaches the specified width.

A specific numerical value adopted as the specified gray-scale value may be set according to a requirement or by experiences. For example, the specified gray-scale value may be 0.

For example, when the specified width is 120 pixels and the width of a certain first image is 116 pixels, the left side of the first image may be filled with 2 pixels with the specified gray-scale value, and the right side of the first image may be filled with 2 pixels with the specified gray-scale value.

In the second case where the width of the first image is larger than the specified width, pixels on the left and right sides of the first image may be uniformly cropped until the width of the first image reaches the specified width.

For example, when the specified width is 120 pixels and the width of a certain first image is 124 pixels, 2 pixels may be cropped from the left side of the first image, and 2 pixels may be cropped from the right side of the first image.

When the CNN model is trained by using the plurality of training images obtained in such a manner, all the training images may be ensured to have the same height and width. In such case, when the CNN model to be trained is trained, a plurality of processes may be set in a computer, and each process may be controlled to process a training image, so that the speed at which the CNN model is trained may be increased.

In the second manner, all the training images have the specified height, but the widths of each of the training images are not limited.

In such a manner, the plurality of initial training images may be acquired at first, and for each of the initial training images in the plurality of initial training images, a width-height ratio of the initial training image may be kept, the initial training image is processed to obtain an image with the specified height, and a width corresponding to the specified height is determined as a width of the initial training image. All of the initial training images are processed in the same way, and then the plurality of training images may be obtained.

For example, for a certain initial training image, when it is processed to obtain an image with the specified height, the width corresponding to the specified height is 120 pixels, then the height of the training image obtained in such a manner is the specified height, and the width is 120 pixels.

When the CNN model is trained by using the plurality of training images obtained in such a manner, the training images have the same specified height but different widths. At this moment, when the CNN model to be trained is trained, the trained CNN model may be ensured to have relatively higher recognition accuracy.

It is to be noted that the plurality of training images obtained in the first manner may be used when the CNN model to be trained is specifically trained by using the plurality of acquired training images, thereby implementing rapid acquisition of the trained CNN model, or the plurality of training images obtained in the second manner may be used, thereby ensuring that the trained CNN model has relatively higher recognition accuracy. In addition, the CNN model may also be trained by using the training images obtained in both the first manner and the second manner, thereby increasing the training speed of the CNN model and simultaneously ensuring that the trained CNN model has relatively higher recognition accuracy.

In step 203, on the convolution layer of each level, convolution operation and maximal pooling operation are performed on each of the training images to obtain a first feature image of each of the training images on the convolution layer of each level by using the initial convolution kernel and initial bias matrix of the convolution layer of each level.

By the convolution operation and the maximal pooling operation, features of different levels of the images may be extracted more and more deeply. Therefore, when the CNN model to be trained is trained, the convolution operation and the maximal pooling operation may be performed on the training images on the convolution layer of each level to obtain the features of the training images.

When the convolution operation is performed, it is necessary to use the convolution kernels and bias matrixes of the convolution layer of each level. When the maximal pooling operation is performed, reference will be made to the convolutional images obtained by convolution. One convolutional image may be obtained by the convolution operation on each of the different convolution layers and one feature image may be obtained by the maximal pooling operation on each convolutional image. Thus, images obtained by the convolution operation on the convolution layer of each level are called the convolutional images on the convolution layer of each level, and images obtained by the maximal pooling operation on the convolutional images on the convolution layer of each level are called the first feature images on the convolution layer of each level in the embodiment of the present disclosure.

With reference to the abovementioned content, the step that the convolution operation and the maximal pooling operation are performed on each of the training images to obtain the first feature image of each of the training images on the convolution layer of each level by using the initial convolution kernel and initial bias matrix on the convolution layer of each level includes, but not limited to, the following Step 2031 to Step 2033.

In Step 2031, for each of the training images, the first feature image on the convolution layer of a previous level is input to a current convolution layer, and the convolution operation is performed on the first feature image on the convolution layer of the previous level to obtain the convolutional image on the current convolution layer by using the initial convolution kernel and initial bias matrix of the current convolution layer. The first feature image on the convolution layer of the previous level is the training image if the current convolution layer is the convolution layer of the first level.

Specifically, for each of the training images, if the current convolution layer is the convolution layer of the first level, the training image may be transmitted to the convolution layer of the first level at first, and the convolution operation is performed on the training image to obtain the convolutional image on the convolution layer of the first level by using the initial convolution kernel and initial bias matrix on the convolution layer of the first level. Furthermore, the maximal pooling operation is performed on the convolutional image on the convolution layer of the first level to obtain the first feature image on the convolution layer of the first level. The first feature image on the convolution layer of the first level is transmitted to the convolution layer of the second level, and the convolution operation and the maximal pooling operation are performed on the convolution layer of the second level.

When the convolution operation is performed on the first feature image on the convolution layer of the previous level by using the initial convolution kernel and initial bias matrix on the current convolution layer, the convolution operation may be performed on the first feature image on the convolution layer of the previous level by using each convolution kernel in the current convolution layer, and a sliding step length of each convolution kernel in the current convolution layer on the first feature image on the convolution layer of the previous level is 1.

Specifically, if the current convolution layer is, for example, the convolution layer of the first level, when the convolution operation is performed on the training image by using a certain convolution kernel in the convolution layer of the first level, the following formula may be adopted:

$$D_i^1 = I * C_i^1 + B_i^1$$

where $D_i^1$ represents the convolutional image, obtained by performing the convolution operation on the training image I by using the $i^{th}$ convolution kernel $C_i^1$ in the convolution kernels on the convolution layer of the first level, on the convolution layer of the first level, and $B_i^1$ represents the $i^{th}$ bias matrix in the bias matrixes $B^1$ on the convolution layer of the first level.

Optionally, considering a property of the convolution operation, when the convolution operation is performed, the convolution operation might not be performed on the pixels on an edge of the image, so that the size of the convolutional image obtained by the convolution operation is changed. In order to avoid such a condition, before the convolution operation is performed on the convolution layer of each level, pixel filling may also be performed on the image on which the convolution operation is to be performed, and then a size of the image on which the convolution operation is to be performed may be kept unchanged after the convolution operation is performed.

Specifically, when the image on which the convolution operation is to be performed is filled, a periphery of the image on which the convolution operation is to be performed may be filled by using a preset gray-scale value, such as "0". The interval at which the filling is performed is related to the dimension of the convolution kernel. When the dimension of the convolution kernel is n, the step length at which the filling is performed is (n−1)/2. For example, when the convolution kernel is 3*3, the step length at which the filling is performed is 1 pixel.

The image on which the convolution operation is to be performed in the step is an image input to the convolution layer of each level. For example, when the current convolution layer is the convolution layer of the first level, the image on which the convolution operation is to be performed is the training image. When the current convolution layer is not the convolution layer of the first level, the image on which the convolution operation is to be performed is the first feature image on the convolution layer of the previous level.

In Step 2032, after the maximal pooling operation is performed on the convolution image on the current convolution layer to obtain the first feature image of the training image on the current convolution layer. The first feature image on the current convolution layer is then transmitted to the convolution layer of the next level.

Specifically, when the maximal pooling operation is performed on the convolutional image on the current convolution layer, a sliding box with a specified size, such as a 3×3 sliding box, may be adopted to slide from left to right and from top to bottom in each of the convolutional images on the current convolution layer, the sliding step length is a preset number of pixels, and for example, the preset number of pixels are 2 pixels. When the sliding box slides on each convolutional image, the elements, which are smaller than 0, of all elements contained in the sliding box are set to be 0. Then, a maximum element of all the elements is extracted, and a new image is reconstructed according to a sliding sequence. After the operation is finished, the first feature image on the current convolution layer is obtained.

The length and width of the first feature image on the current convolution layer may be calculated according to a property of the maximal pooling operation, and may be represented by the following formula:

$$w = \text{floor}\left(\frac{w_0 - m}{1}\right) + 1$$

where floor represents a rounding-down function. For example, floor(2.5)=2. w represents the length or width of the first feature image on the current convolution layer, m is the number of pixels contained in a length or width of the sliding box, l is the sliding step length, and $w_0$ is the height or with of the convolutional image on the current convolution layer. For example, when the size of the convolutional image on the current convolution layer is 32×$w_0$, the sliding box is 3*3 and the sliding step length is 2, the size of the first feature image, obtained by the maximal pooling operation, on the current convolution layer is 15×$w_1$, $$w_1 = \text{floor}\left(\frac{w_0 - 3}{2}\right) + 1.$$

In Step 2033, the convolution operation and the maximal pooling operation are performed on the first feature image on the current convolution layer on the convolution layer of the next level until the convolution operation and the maximal pooling operation are performed on the convolution layer of a last level to obtain the first feature image on the convolution layer of the last level.

A principle for performing the convolution operation and the maximal pooling operation on the convolution layer of each level is consistent with principles in Step 2031 and Step 2032. For detail please refer to the contents in Step 2031 and Step 2032 and the detailed description will not be elaborated herein.

In Step 204, horizontal pooling operation is performed on the first feature image of each of the training images on the convolution layer of at least one of the levels to obtain a second feature image of each of the training images on the convolution layer of each level.

When the horizontal pooling operation is performed, the horizontal pooling operation may be performed on the first feature images on all the convolution layers, and the horizontal pooling operation may also be performed on the first feature images on some of the convolution layers. For example, if the CNN model to be trained includes four levels of convolution layers, the horizontal pooling operation may be performed on the convolution layer of each level, or the horizontal pooling operation may be performed on only the convolution layer of the second level, the convolution layer of the third level and the convolution layer of the fourth level.

Specifically, the step that the horizontal pooling operation is performed on the first feature image of each of the training images on the convolution layer of at least one of the levels to obtain the second feature image of each of the training images on the convolution layer of each level includes, but not limited to, the following Step 2041 to Step 2043.

In Step 2041, for the first feature image of each training image on the convolution layer of each level, a maximum value of elements of each of rows of each of the images in the first feature image on the convolution layer are extracted. The first feature image includes a preset number of images, and the preset number is the same as each of the numbers of the convolution kernels and bias matrixes of the convolution layer.

For example, when the horizontal pooling operation is performed on the first feature image on the convolution layer of the second level, if the first feature image on the convolution layer of the second level is $R^2$, a process of performing the horizontal pooling operation on $R^2$ to obtain the second feature image $H^1$ on the convolution layer of the second level is as follows:

if the ith feature image $R_i^2$ in $R^2$ is an image of which a height and width are 7 and $w_2$ respectively, a maximum value of all elements in each of rows of $R_i^2$ is extracted.

In Step 2042, the maximum values extracted from all the rows of each image are arranged into a one-dimensional vector according to arrangement of pixels of each image.

Figure 4:
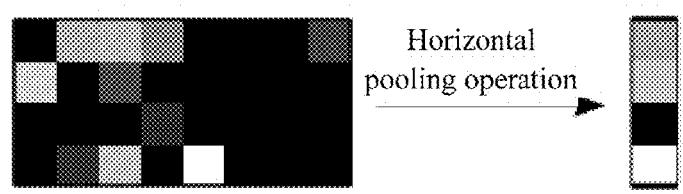
FIG. 4 is a schematic diagram illustrating a process of a horizontal pooling operation, according to another embodiment of the present disclosure.

In combination with the example in Step 2041, the maximum values of respective rows are arranged into a one-dimensional vector with a length of 7 according to top-down arrangement of pixels of each image. FIG. 4 shows a schematic diagram illustrating a process of performing horizontal pooling operation on a certain image in a first feature image on the convolution layer of a second level.

In Step 2043, the one-dimensional vectors of all the images in the first feature image on the convolution layer are combined to obtain the second feature image on the convolution layer.

In combination with the example in Step 2041, if $R^2$ includes 256 images, after the abovementioned operation is repeatedly performed on all of the 256 images in $R^2$, 256 one-dimensional vectors with the length of 7 are obtained. Each of one-dimensional vectors is considered as a column vector, and the one-dimensional vectors are sequentially combined into an image $H^1$ of which a height and width are 7 and 256 respectively. $H^1$ is the second feature image, obtained by the horizontal pooling operation over $R^2$, on the convolution layer of the second level.

In combination with the CNN model to be trained shown in FIG. 3, the CNN model to be trained includes four levels of convolution layers and two levels of fully connected layers, and the convolution layers of the respective levels include the same or different numbers of convolution kernels and bias matrixes. On such a basis, when the horizontal pooling operation is performed on the first feature image of each of the training images on the convolution layer of at least one of the levels to obtain the second feature image of each of the training images on the convolution layer of each level, the horizontal pooling operation is performed on the first feature image of each of the training images on the convolution layer of the second level, the first feature image of each of the training images on the convolution layer of the third level and the first feature image of each of the training images on the convolution layer of the fourth level to obtain the second feature image of each of the training images on the convolution layer of the second level, the second feature image of each of the training images on the convolution layer of the third level and the second feature image of each of the training images on the convolution layer of the fourth level, respectively respectively.

In Step 205, a feature vector of each of the training images are determined according to the second feature image of each of the training images on the convolution layer of each level.

Specifically, for each of the training images, its feature vector is obtained by cascading the second feature images of the training image on the convolution layer of each level and connecting the elements in all the rows in the second feature images on the convolution layer of each level head to tail.

In combination with the CNN model to be trained shown in FIG. 3, for each of the training images, the feature vector of the training image may be determined according to the second feature image of the training image on the convolution layer of the second level, the second feature image of the training image on the convolution layer of the third level and the second feature image of the training image on the convolution layer of the fourth level.

Specifically, for a certain training image, the second feature image on the convolution layer of the second level, the second feature image of the training image on the convolution layer of the third level and the second feature image of the training image on the convolution layer of the fourth level may be cascaded, and the elements in all the rows in the second feature image on the convolution layer of the second level, the second feature image of the training image on the convolution layer of the third level and the second feature image of the training image on the convolution layer of the fourth level are connected head to tail to obtain the feature vector of the training image.

For example, if the second feature image of the training image on the convolution layer of the second level is $H^1$, the second feature on the convolution layer of the third level is $H^2$ and the second feature image of the training image on the convolution layer of the fourth level is $H^3$, elements in all rows in $H^1$ may be connected head to tail to obtain a first one-dimensional vector; elements in all rows in $H^2$ are connected head to tail to obtain a second one-dimensional vector; and elements in all rows in $H^3$ are connected head to tail to obtain a third one-dimensional vector. The first one-dimensional vector, the second one-dimensional vector and the third one-dimensional vector are further connected head to tail to obtain the feature vector of the training image.

In Step 206, each feature vector is processed to obtain a classification probability vector of each of the training images according to the initial weight matrixes and the initial bias vectors.

Specifically, a feature vector of a training image may be input to the fully connected layer, the feature vector is multiplied by the weight matrix of the fully connected layer, and a product result is added to the bias vector of the fully connected layer, thereby obtain a classification probability vector of the training image.

The classification probability vector is a one-dimensional vector, and the number of elements in the classification probability vector is related to the number of image classifications which may be recognized by the CNN model to be trained. For example, if 10 classifications of images may be recognized by using the training images, the classification probability vector includes 10 elements. Each of the elements represents a probability that the training image belongs to a certain classification.

In Step 207, a classification error is calculated according to the classification probability vector and initial classification of each of the training images.

The step that the classification error is calculated according to the classification probability vector and initial classification of each of the training images includes, but not limited to, the following Step 2071 to Step 2073.

In Step 2071, initial classifications of each of the training images are acquired.

For each of the training images, its initial classification is known. The initial classification may be manually extracted and recorded. On such a basis, the initial classification of each of the training images may be acquired directly according to recorded data.

In Step 2072, the classification error of each of the training images is calculated according to the classification probability vector and initial classification of each of the training images by using the following formula:

$$\text{Loss}=-Lny_{label},$$

where Loss represents the classification error of each of the training images, label represents the initial classification of each of the training images, $y_i$ represents a element of the classification probability vector of each of the training images, and $y_{label}$ represents a classification probability corresponding to the initial classification. For example, when the initial training image is of a first classification, $y_{label}$ is $y_1$, i.e. a first element in the classification probability vector.

In Step 2073, the mean of the classification errors of all the training images is calculated, and the mean of the classification errors is determined as a classification error.

Of course, the process of calculating the classification errors is described by taking the mean of the classification errors of all the training images as an example. During specific implementation, when the classification errors are calculated, another manner may also be adopted, and will not be specifically limited in the embodiment of the present disclosure.

In Step 208, the model parameters of the CNN model to be trained are regulated on the basis of the classification errors.

Specifically, when the model parameters of the CNN model to be trained is regulated, a Stochastic Gradient Descent (SGD) algorithm is adopted without limitation to reversely transmit the classification errors back to the CNN model to be trained, thereby updating all the elements in the model parameters of the CNN model to be trained.

A specific implementation process of reversely transmitting the classification errors back to the CNN model to be trained to update all the elements in the model parameters of the CNN model to be trained by using the SGD algorithm will not be specifically limited in the embodiment of the present disclosure.

In Step 209, the process of determining the classification errors is continued on the basis of the regulated model parameters and the plurality of training images until the number of iterations reaches a preset number.

Specifically, Step 203 to Step 208 are repeated by using the plurality of training images acquired in Step 202 and the regulated model parameters obtained by Step 208 until the number of repetition times, i.e. the number of iterations, reaches the preset number.

A specific range of the numerical value of the preset number is not specifically limited in the embodiment of the present disclosure. In order to make the CNN model to be trained relatively more accurate, a value of the preset number may be relatively larger. During specific implementation, the preset number may be an empirical value, and for example, is 300,000.

In Step 210, model parameters obtained when the number of iterations reaches the preset number are determined as the model parameters of the trained CNN model.

For example, if the preset number is 300,000, the model parameters obtained when the number of iterations reaches 300,000 are determined as the model parameters of the trained CNN model.

In Step 211, an image to be recognized is input into the trained CNN model, a classification probability vector of the image to be recognized is calculated, and a classification corresponding to an element, which is the most approximate to 1, of the elements of the classification probability vector is determined as the classification of the image to be recognized.

Specifically, if the classification probability vector includes 10 elements, each element corresponding to a classification, and the second element in the classification probability vector is the most approximate to 1, the image to be recognized belongs to a second classification.

According to the method provided by the embodiment of the present disclosure, after the convolution operation and the maximal pooling operation are performed on the training images on the convolution layer of each level, the horizontal pooling operation is further performed on the feature images obtained by the maximal cooling operation. During the horizontal cooling operation, the feature images which identify features of the feature images in a horizontal direction may further be extracted from the feature images to ensure that the trained CNN model may break limits of a size of an image to be recognized in the horizontal direction during image classification identification and recognize an image to be recognized with any size, so that an image recognition application range of the CNN model trained in such a manner is relatively wider.

Figure 5A:
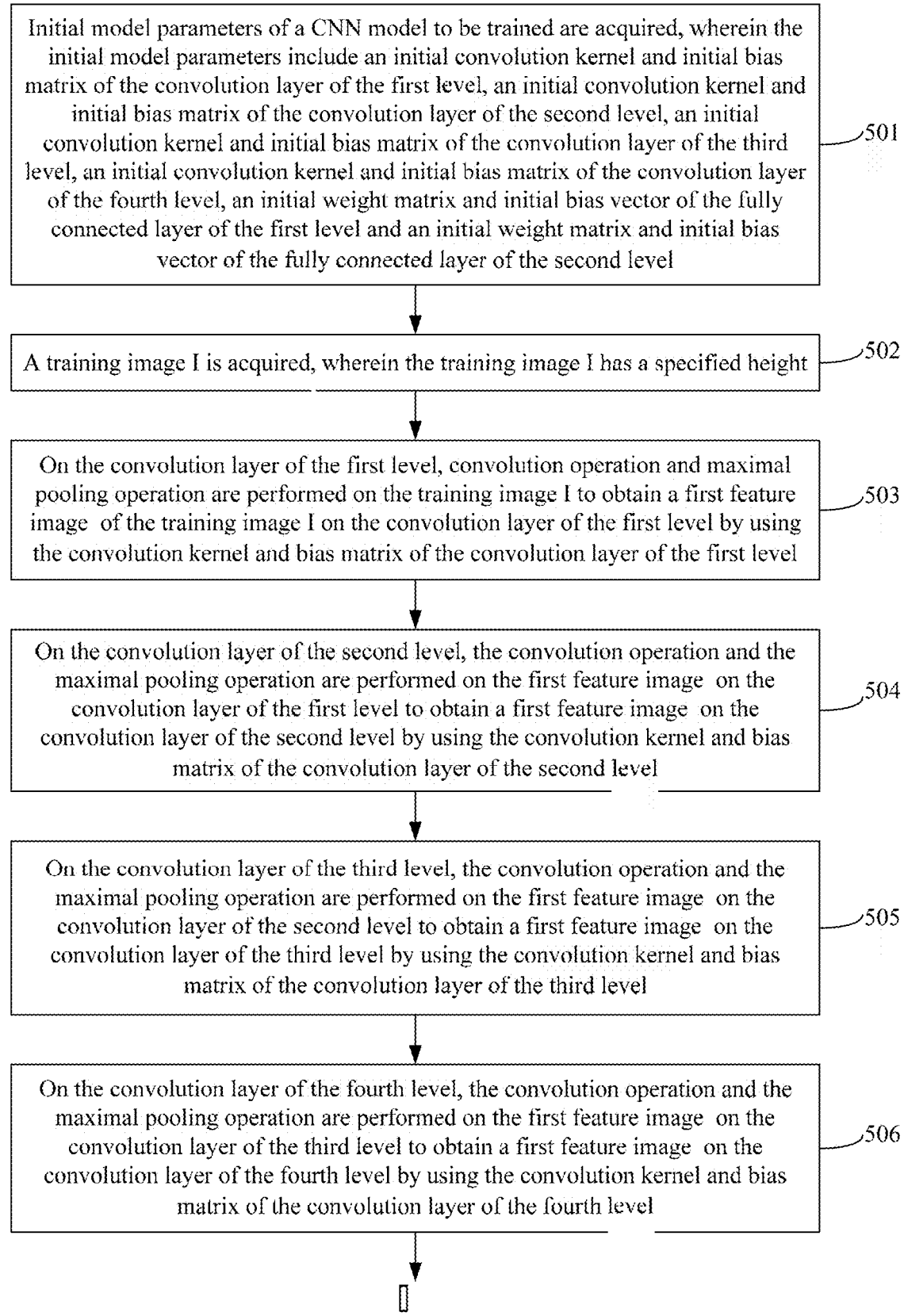
FIGS. 5A-5B are flow charts showing a method for training a CNN model, according to another embodiment of the present disclosure.
Figure 5B:
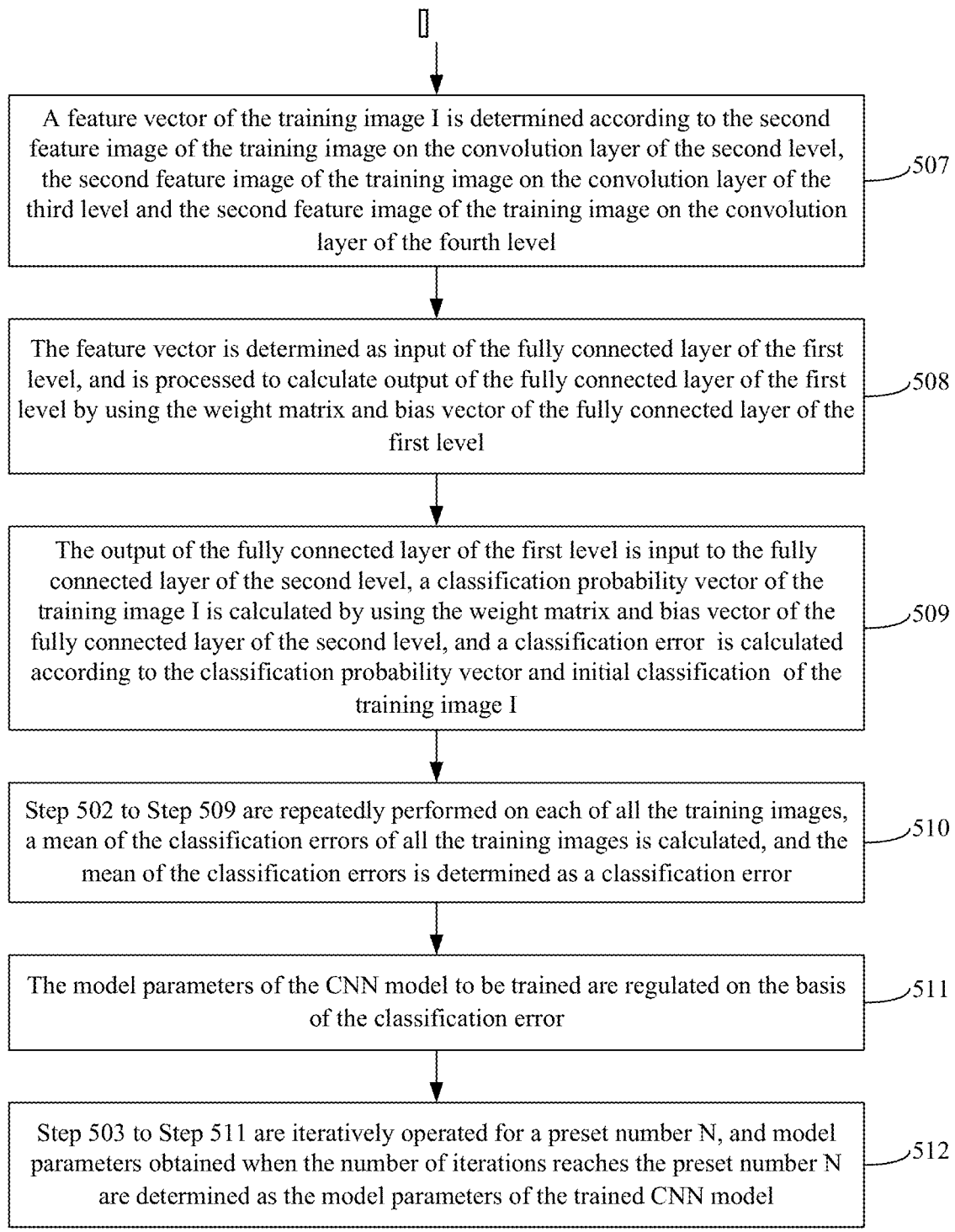

With reference to the contents of the embodiment corresponding to FIG. 1 or FIG. 2 and the schematic diagram illustrating the CNN model to be trained shown in FIG. 3, a method provided by the embodiment of the present disclosure is explained with the condition that the CNN model to be trained includes four levels of convolution layers and two levels of fully connected layers as an example in the embodiment of the present disclosure. In addition, in the embodiment of the present disclosure, descriptions are made with horizontal pooling operation over first feature images on the convolution layer of a second level, first feature images on the convolution layer of the third level and first feature images on the convolution layer of the fourth level as an example in the embodiment of the present disclosure. As shown in FIGS. 5A-5B, a flow of the method provided by the embodiment of the present disclosure includes the following steps.

In Step 501, initial model parameters of a CNN model to be trained are acquired, wherein the initial model parameters include an initial convolution kernel and initial bias matrix of the convolution layer of the first level, an initial convolution kernel and initial bias matrix of the convolution layer of the second level, an initial convolution kernel and initial bias matrix of the convolution layer of the third level, an initial convolution kernel and initial bias matrix of the convolution layer of the fourth level, an initial weight matrix and initial bias vector of the fully connected layer of the first level and an initial weight matrix and initial bias vector of the fully connected layer of the second level.

The convolution layers of the respective levels may include the same or different numbers of convolution kernels and bias matrixes, and the fully connected layer of the respective levels include the same or different numbers of weight matrixes and bias vectors. The numbers of the convolution kernels and bias matrixes of the convolution layer of each level and the numbers of the weight matrixes and bias vectors of each level of fully connected layers are not specifically limited in the embodiment of the present disclosure. In addition, dimensions of each convolution kernel and bias matrix and dimensions of each weight matrix and each bias vector are also not limited in the embodiment of the present disclosure. During specific implementation, the numbers and dimensions of the convolution kernels and bias matrixes of the convolution layer of each level and the numbers and dimensions of the weight matrixes and bias vectors of each level of fully connected layer may adopt empirical values.

In addition, in the embodiment of the present disclosure, the convolution kernels, bias matrixes, weight matrixes and bias vectors in the convolution layer of each level in the initial model parameters are called initial convolution kernels, initial bias matrixes, initial weight matrixes and initial bias vectors. Therefore, when the CNN model to be trained is trained, the initial convolution kernels of the convolution layer of each level, the initial bias matrixes of the convolution layer of each level, the initial weight matrixes of the fully connected layers and the initial bias vectors of the fully connected layers will be acquired.

In order to facilitate explanation about the embodiment of the present disclosure, in the embodiment of the present disclosure, the method provided by the embodiment of the present disclosure is explained with the condition that the convolution layer of the first level includes 96 convolution kernels $C^1$ with sizes of 5×5, $C^1=\{C_i^1\}_{i=1}^{96}$, and, 96 bias matrixes $B^1$ with sizes of 5×5, $B^1=\{B_i^1\}_{i=1}^{96}$, the convolution layer of the second level includes 256 convolution kernels $C^2$ with sizes of 5×5, $C^2=\{C_i^2\}_{i=1}^{256}$, and 256 bias matrixes $B^2$ with sizes of 5×5, $B^2=\{B_i^2\}_{i=1}^{256}$, the convolution layer of the third level includes 384 convolution kernels $C^3$ with sizes of 3×3, $C^3=\{C_i^3\}_{i=1}^{384}$, and 384 bias matrixes $B^3$ with sizes of 3×3, $B^3=\{B_i^3\}_{i=1}^{384}$, the convolution layer of the fourth level includes 512 convolution kernels $C^4$ with sizes of 3×3, $C^4=\{C_i^4\}_{i=1}^{512}$, and 512 bias matrixes $B^4$ with sizes of 3×3, $B^4=\{B_i^4\}_{i=1}^{512}$, the fully connected layer of the first level includes a weight matrix $W^1$ with a size of 3,456×1,024 and an bias vector $B^5$ with a length of 1,024, and the fully connected layer of the second level includes a weight matrix $W^2$ with a size of 1,024×10 and an bias vector $B^6$ with a length of 10 as an example.

When the initial model parameters of the CNN model to be trained are acquired, a value may be randomly selected from a specified numerical value range as a value of each element in the initial model parameter. For example, for each element in each initial convolution kernel, initial weight matrix, initial bias matrix and initial bias vector, a random number may be selected from interval [−r,r]. Here, r is a threshold value of the initial model parameter, and it may be an empirical value. For example, r may be 0.001.

In Step 502, a training image I is acquired, wherein the training image I has a specified height.

The training image I is one of a plurality of training images. In order to facilitate description, a process of training the CNN model to be trained is explained with processing of the training image I as an example in subsequent implementation of the present disclosure.

In addition, the training image I has the specified height and a specified width. Specifically, the specified height may be a first number of pixels, and the specified width may be a second number of pixels. Specifically, the first number may be an empirical value, and for example, the first number may be 32. The second number may be a random number selected within a preset range, wherein the preset range may be 48 to 256. In order to facilitate description, a size of the training image is, for example, $32*w_0$ in the subsequent embodiment of the present disclosure, wherein, 32 is the first number, and $w_0$ is the second number.

In Step 503, on the convolution layer of the first level, convolution operation and maximal pooling operation are performed on the training image to obtain a first feature image $R^1$ of the training image I on the convolution layer of the first level by using the convolution kernel and bias matrix of the convolution layer of the first level.

The step that the convolution operation and the maximal pooling operation are performed on the training image I on the convolution layer of the first level by using the initial convolution kernel and initial bias matrix of the convolution layer of the first level will be specifically described below with reference to each initial model parameters in Step 502. Specifically, the process of obtaining the first feature image $R^1$ of the training image I on the convolution layer of the first level is implemented as follows.

In Step 5031, the training image I is filled to obtain a filled training image $I_{tr}$.

The step is an optional step. By the step, a convolutional image on the convolution layer of the first level obtained by the convolution operation on the convolution layer of the first level may be ensured to have the same size with the training image I. The process of filling has been described in Step 203, may specifically refer to the content in Step 203, and will not be elaborated herein.

For example, the size of the training image I is $32 \times w_0$, and a periphery of the training image I may be uniformly filled with element "0", wherein a filling step length is 2, so that a training image $I_{tr}$ with a height and width of 36 pixels and $w_0 + 4$ pixels respectively is obtained.

In Step 5032, on the convolution layer of the first level, the convolution operation is performed on the filled training image $I_{tr}$ to obtain the convolutional image $D^1$ on the convolution layer of the first level by using the convolution kernels and bias matrixes on the convolution layer of the first level.

Specifically, in combination with the example in Step 502, the convolution operation may be performed on the filled training image $I_{tr}$ by using each convolution kernel in $C^1$, and a sliding step length of each convolution kernel on the filled training image $I_{tr}$ is 1, that is:

$$D_i^1 = I_{tr} * C_i^1 + B_i^1$$

where $D_i^1$ represents a convolutional image on the convolution layer of the first level obtained by performing the convolution operation on the filled training image $I_{tr}$ by using the ith convolution kernel $C_i^1$ in the convolution layer of the first level, and $B_i^1$ represents the ith bias matrix in the bias matrixes $B^1$ in the convolution layer of the first level. According to a property of the convolution operation over an image, the convolutional image $D^1 = \{D_i^1\}_{i=1}^{96}$, on the convolution layer of the first level may be obtained, where the size of $D_i^1$ is $32 \times w_0$.

In Step 5033, the maximal pooling operation is performed on the convolutional image $D^1$ on the convolution layer of the first level to obtain the first feature image $R^1$ on the convolution layer of the first level.

A specific content about the maximal pooling operation has been elaborated in Step 203, may specifically refer to the content in Step 203, and will not be elaborated herein.

For example, in combination with the example in Step 502, a 3×3 sliding box may be adopted to slide from left to right and from top to bottom in each of the convolutional images $D^1$ on the convolution layer of the first level, and the sliding step length is 2. When the sliding box slides on each convolutional image, elements, which is smaller than 0, of 9 elements in the box are set to be 0, then a maximum element in the 9 elements is extracted, and a new image is reconstructed according to the sliding sequence. After the operation is finished, the first feature image $R^1$ on the convolution layer of the first level is obtained, $R^1 = \{R_i^1\}_{i=1}^{96}$. According to a property of the maximal pooling operation, a size of $R^1$ is $15 \times w_1$, where $$w_1 = \text{floor}\left(\frac{w_0 - 3}{2}\right) + 1,$$

and floor represents a rounding-down function. For example, floor(2.5)=2. In addition, "3" in the numerator in the formula represents a size of a dimension of the sliding box, and "2" in the denominator represents the sliding step length.

It is to be noted that 3×3 here is only an example, and during specific implementation, the size of the sliding box may also be of another numerical value. The size of the sliding box will not be limited in the embodiment of the present disclosure.

In Step 504, on the convolution layer of the second level, the convolution operation and the maximal pooling operation are performed on the first feature image $R^1$ on the convolution layer of the first level to obtain a first feature image $R^2$ on the convolution layer of the second level by using the convolution kernel and bias matrix of the convolution layer of the second level.

The step that the convolution operation and the maximal pooling operation are performed on the first feature image $R^1$ on the convolution layer of the first level by using the convolution kernel and bias matrix of the convolution layer of the second level on the convolution layer of the second level will be specifically described below with reference to each initial model parameter. Specifically, the process of obtaining the first feature image $R^2$ on the convolution layer of the second level is implemented as follows.

In Step 5041, the first feature image $R^1$ on the convolution layer of the first level is filled to obtain a filled training image $Rp^1$.

The principle of the step is consistent with the principle of Step 5031, and may specifically refer to the content in Step 5031. The step is an optional step. By the step, the image obtained by the convolution operation may be ensured to have the same size with the first feature image $R^1$ on the convolution layer of the first level.

For example, in combination with the example in Step 502, a filling length includes, but not limited to, 2, the filled image $Rp^1$ is $Rp^1=\{Rp_i^1\}_{i=1}^{96}$, and a height and width of $Rp_i^1$, are 19 and $w_1+4$ respectively.

In Step 5042, on the convolution layer of the second level, the convolution operation is performed on the filled image $Rp^1$ to obtain the convolutional image $D^2$ on the convolution layer of the second level by using the convolution kernels and bias matrixes on the convolution layer of the second level.

The principle of the step is consistent with the principle of step S032, may specifically refer to the content in Step 5032, and will not be elaborated herein.

Specifically, in combination with the example in the abovementioned step, the convolution operation may be performed on each image in $Rp^1$ by using each convolution kernel in $C^2$, a sliding step length of each convolution kernel on the image is 1, and convolution results are added to obtain each convolutional image $D_i^2$ on the convolution layer of the second level. That is:

$$D_i^2 = \sum_{j=1}^{96} Rp_j^1 * C_i^2 + B_i^2$$

where $D_i^2$ represents the ith obtained convolutional image on the convolution layer of the second level, $C_i^2$ represents the ith convolution kernel in $C^2$, $B_i^2$ represents the ith bias matrix in $B^2$, and $Rp_j^1$ represents the jth image in $Rp^1$. According to the property of the convolution operation, $D^2=\{D_i^2\}_{i=1}^{256}$, where $D_i^2$ represents the convolutional image obtained by performing the convolution operation on $Rp^1$ by using the ith convolution kernel $C_i^2$, and the size of $D_i^2$ is $15 \times w_1$.

In Step 5043, the maximal pooling operation is performed on the convolutional image $D^2$ on the convolution layer of the second level to obtain the first feature image $R^2$ on the convolution layer of the second level.

The principle of the step is consistent with the step of Step 5033, and may specifically refer to the content in Step 5033. Specifically, $R^2=\{R_i^2\}_{i=1}^{256}$, the size of $R_i^2$ is $7 \times w_2$, and $$w_2 = \text{floor}\left(\frac{w_1 - 3}{2}\right) + 1.$$

In Step 5044, horizontal pooling operation is performed on the first feature image $R^2$ on the convolution layer of the second level to obtain a second feature image $H^1$ on the convolution layer of the second level.

Specifically, the ith feature image $R_i^2$ in $R^2$ is an image of which a height and width are 7 and $w_2$ respectively, and the maximum value of all elements in each of rows of $R_i^2$ is extracted, and the maximum values are sequentially connected into a one-dimensional vector with a length of 7.

After the operation is repeatedly performed on all of the 256 feature images in $R^2$, 256 one-dimensional vectors with the length of 7 are obtained. The respective one-dimensional vectors are considered as column vectors, and are sequentially combined into an image $H^1$ of which a height and width are 7 and 256 respectively. $H^1$ is the second feature image, obtained by the horizontal pooling operation over $R^2$, on the convolution layer of the second level.

In Step 505, on the convolution layer of the third level, the convolution operation and the maximal pooling operation are performed on the first feature image $R^2$ on the convolution layer of the second level to obtain a first feature image $R^3$ on the convolution layer of the third level by using the convolution kernel and bias matrix of the convolution layer of the third level.

The step that the convolution operation and the maximal pooling operation are performed on the first feature image $R^2$ on the convolution layer of the second level by using the convolution kernel and bias matrix of the convolution layer of the third level on the convolution layer of the third level will be specifically described below with reference to each model parameters in Step 502. Specifically, the process of obtaining the first feature image $R^3$ on the convolution layer of the third level is implemented as follows.

In Step 5051, the first feature image $R^2$ on the convolution layer of the second level is filled to obtain a filled training image $Rp^2$.

The principle of the step is consistent with the principle of Step 5031, and may specifically refer to the content in Step 5031. The step is an optional step. By the step, the image obtained by the convolution operation may be ensured to have the same size with the first feature image $R^2$ on the convolution layer of the second level.

Specifically, a filling length includes, but not limited to, 1, and the new image $Rp^2$ is obtained by perform filling, wherein $Rp^2=\{Rp_i^2\}_{i=1}^{256}$, and a height and width of are 9 and $w_2+2$ respectively.

In Step 5052, on the convolution layer of the third level, the convolution operation is performed on the filled image $Rp^2$ to obtain a convolutional image $D^3$ on the convolution layer of the third level by using the convolution kernels and bias matrixes on the convolution layer of the third level.

The principle of the step is consistent with the principle of step 5032, may specifically refer to the content in Step 5032, and will not be elaborated herein.

A sliding step length of each convolution kernel on the filled image $Rp^2$ is 1, that is:

$$D_i^3 = \sum_{j=1}^{256} Rp_j^2 * C_i^3 + B_i^3$$

where $D_i^3$ represents the ith obtained convolutional image on the convolution layer of the third level, $C_i^3$ represents the ith convolution kernel in $C^3$, $B_i^3$ represents the ith bias matrix in $B^3$, and $Rp_j^2$ represents the jth image in $Rp^2$. According to the property of the convolution operation, $D^3=\{D_i^3\}_{i=1}^{384}$, where $D_i^3$ represents the convolutional image obtained by performing the convolution operation on $Rp^2$ by using the ith convolution kernel $C_i^3$, and the size of $D_i^3$ is $7 \times w_2$.

In Step 5053, the maximal pooling operation is performed on the convolutional image $D^3$ on the convolution layer of the third level to obtain the first feature image $R^3$ on the convolution layer of the third level.

The principle of the step is consistent with the step of Step 5033, and may specifically refer to the content in Step 5033. Specifically, $R^3=\{R_i^3\}_{i=1}^{384}$, and the size of $R_i^3$ is $3 \times w_3$, where $$w_3 = \text{floor}\left(\frac{w_2 - 3}{2}\right) + 1.$$

In Step 5054, horizontal pooling operation is performed on the first feature image $R^3$ on the convolution layer of the third level to obtain a second feature image $H^2$ on the convolution layer of the third level.

The principle of the step is consistent with the step of Step 5044, and may specifically refer to the content of Step 5044.

Specifically, the horizontal pooling operation may be performed on the first feature image $R^3$ on the convolution layer of the third level to obtain an image $H^2$ of which a height and width are 3 and 384 respectively. $H^2$ is output of the horizontal pooling operation over $R^3$.

In Step 506, on the convolution layer of the fourth level, the convolution operation and the maximal pooling operation are performed on the first feature image $R^3$ on the convolution layer of the third level to obtain a first feature image $R^4$ on the convolution layer of the fourth level by using the convolution kernel and bias matrix of the convolution layer of the fourth level.

The step that the convolution operation and the maximal pooling operation are performed on the first feature image $R^3$ on the convolution layer of the third level by using the convolution kernel and bias matrix of the convolution layer of the fourth level on the convolution layer of the fourth level will be specifically described below with reference to each model parameters in Step 502. Specifically, the process of obtaining the first feature image $R^4$ on the convolution layer of the fourth level is implemented as follows.

In Step 5061, on the convolution layer of the fourth level, the convolution operation is performed on the first feature image $R^3$ on the convolution layer of the third level to obtain a convolutional image $D^4$ on the convolution layer of the fourth level by using the convolution kernels and bias matrixes on the convolution layer of the fourth level.

A sliding step length of the convolution kernel on $R^3$ is 1, that is:

$$D_i^4 = \sum_{j=1}^{384} R_j^3 * C_i^4 + B_i^4$$

where $D_i^4$, represents the ith obtained convolutional image on the convolution layer of the fourth level, $C_i^4$ represents the ith convolution kernel in $C^4$, $B_i^4$ represents the ith bias matrix in $B^4$, and $R_j^3$ represents the jth image in $R^3$. According to the property of the convolution operation, $D^4 = \{D_i^4\}_{i=1}^{512}$, where $D_i^4$ represents the convolutional image obtained by performing the convolution operation on $R^3$ by using the ith convolution kernel $C_i^4$, and the size of $D_i^4$ is $1 \times (w_3-2)$. Since the maximal pooling operation is not performed on the first feature image on the convolution layer of the fourth level, the convolutional image is the first feature image on the convolution layer of the fourth level, that is, $R^4 = D^4$, $R^4 = \{R_i^4\}_{i=1}^{512}$, and the size of $R_i^4$ is $1 \times (w_3-2)$.

In Step 5062, the horizontal pooling operation is performed on the first feature image $R^4$ on the convolution layer of the fourth level to obtain a second feature image $H^3$ on the convolution layer of the fourth level.

The principle of the step is consistent with the step of Step 5044, and may specifically refer to the content of Step 5044.

Specifically, the ith feature image $R_i^4$ in $R^4$ is a vector with a length of $w_3-2$, and a maximum value in all elements in $R_i^4$ is extracted. After the operation is repeatedly performed on all 512 feature images in $R^4$, 512 numbers are obtained, and these numbers are sequentially connected into a vector $H^3$ with a length of 512. $H^3$ is the output of the horizontal pooling operation over $R^4$.

In Step 507, a feature vector $Fc^1$ of the training image I is determined according to the second feature image $H^1$ of the training image on the convolution layer of the second level, the second feature image $H^2$ of the training image on the convolution layer of the third level and the second feature image $H^3$ of the training image on the convolution layer of the fourth level.

Specifically, the column vectors of $H^1$ and $H^2$ may be cascaded by connecting the column vectors of $H^1$ and $H^2$ head to tail, and then the cascaded result is further cascaded with the vector $H^3$ to obtain a one-dimensional vector $Fc^1$. The vector $Fc^1$ is determined as the feature vector of the training image I.

In combination with the examples in each of the abovementioned steps, the size of $H^1$ is $7 \times 256$, the size of $H^2$ is $3 \times 384$ and the length of $H^2$ is 512, so that a length of $Fc^1$ is 3,456.

In Step 508, the feature vector $Fc^1$ is determined as input of the fully connected layer of the first level, and $Fc^1$ is processed to calculate output $Fc^2$ of the fully connected layer of the first level by using the weight matrix and bias vector of the fully connected layer of the first level.

With reference to the content of Step 502, the output $Fc^2$ of the fully connected layer of the first level may be calculated by using the weight matrix $W^1$ and bias vector $B^5$ of the fully connected layer of the first level by using the following formula:

$$Fc^2 = Fc^1 * W^1 + B^5.$$

With reference to the content of Step 508, a length of $Fc^2$ is 1,024. Results obtained in each of the abovementioned steps may refer to specific numerical values in FIG. 3. Of course, the numerical values in FIG. 3 are only examples, and are not intended to form limits to the embodiment of the present disclosure.

In Step 509, the output of the fully connected layer of the first level is input to the fully connected layer of the second level, a classification probability vector Y of the training image I is calculated by using the weight matrix and bias vector of the fully connected layer of the second level, and a classification error Loss is calculated according to the classification probability vector Y and initial classification label of the training image I.

The principle of the step has been specifically described in Step 206 and Step 207, may specifically refer to the contents in Step 206 and Step 207, and will not be elaborated herein.

Specifically, in combination with the example, the output $Fc^2$ of the fully connected layer of the first level may be determined as input of the fully connected layer of the second level. From the content of Step 502, the weight matrix of the fully connected layer of the second level is $W^2$, the bias vector is $B^6$, and the classification probability vector Y of the training image I is calculated where $Y = Fc^2 * W^2 + B^6$, and $Y = [Y_1, Y_2, \wedge\wedge Y_i, \wedge \wedge, Y_n]$, where $Y_i$ represents a probability that the input image I is of an ith classification, and n represents the number of image classifications which may be recognized by the CNN model to be trained. Descriptions are made only with the condition that the CNN model to be trained can recognize 10 image classifications as an example in FIG. 3.

Furthermore, the operation that the classification error Loss is calculated according to the classification probability vector Y and initial classification label of the training image I may be implemented by using the following formula:

Loss=$-Lny_{label}$.

For example, if the initial classification of the training image I is a first classification, then label=1.

In Step 510, Step 502 to Step 509 are repeatedly performed on each of the training images, a mean $\overline{\text{Loss}}$ of classification errors of all the training images is calculated, and the mean of the classification errors is determined as a classification error.

In Step 511, the model parameters of the CNN model to be trained are regulated on the basis of the classification errors.

The principle of the step has been specifically described in Step 208, may specifically refer to the content of Step 208, and will not be elaborated herein.

Specifically, when the classification error is reversely transmitted back to the CNN model to be trained by using an SGD algorithm, a learning rate in the SGD algorithm may adopt 0.01, and the mean of the classification errors $\overline{\text{Loss}}$ calculated in Step 510 is reversely transmitted back to the CNN model to be trained to update all the elements in the convolution kernels $C^1$, $C^2$, $C^3$ and $C^4$, the bias matrixes $B^1$, $B^2$, $B^3$ and $B^4$, the weight matrixes $W^1$ and $W^2$ and the bias vectors $B^5$ and $B^6$.

In Step 512, Step 503 to Step 511 are iteratively operated for a preset number N, and model parameters obtained when the number of iterations reaches the preset number N are determined as the model parameters of the trained CNN model.

A specific range of the numerial value of N is not specifically limited in the embodiment of the present disclosure. In order to make the trained CNN model relatively more accurate, a value of N may be relatively larger. During specific implementation, N may be an empirical value. For example, N is 300,000. The model parameters obtained when the number of iterations reaches 300,000 are determined as the model parameters of the trained CNN model.

An test shows that the CNN model trained by Step 501 to Step 512 has relatively higher accuracy when the CNN model to be trained includes the four levels of convolution layers and the horizontal pooling operation is performed on the convolution layer of the second level, the convolution layer of the third level and the convolution layer of the fourth level, so that the training accuracy of the CNN model may be improved.

According to the method provided by the embodiment of the present disclosure, after the convolution operation and the maximal pooling operation are performed on the training images on the convolution layer of each level, the horizontal pooling operation is further performed on the feature images obtained by the maximal cooling operation. During the horizontal cooling operation, the feature images which identify features of the feature images in a horizontal direction may further be extracted from the feature images to ensure that the trained CNN model may break limits of a size of an image to be recognized in the horizontal direction during image classification identification and recognize an image to be recognized with any size, so that an image recognition application range of the CNN model trained in such a manner is relatively wider.

Figure 6:
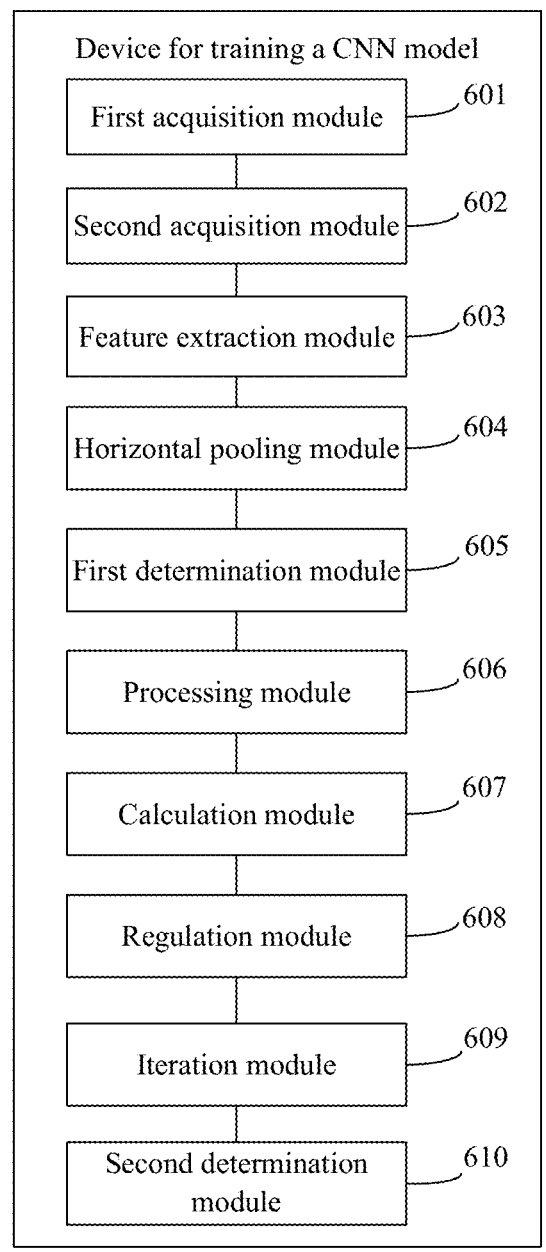
FIG. 6 is a schematic diagram of a structure of a device for training a CNN model, according to another embodiment of the present disclosure.

FIG. 6 is a schematic diagram of a structure of a device for training a CNN model, according to another embodiment of the present disclosure. The device for training the CNN model may be configured to execute the method for training the CNN model provided by the embodiment corresponding to any one of FIG. 1, FIG. 2 and FIGS. 5A-5B. As shown in FIG. 6, the device includes the following modules.

A first acquisition module 601 is configured to acquire initial model parameters of a CNN model to be trained, wherein the initial model parameters includes initial convolution kernels and initial bias matrixes of convolution layers of respective levels, and an initial weight matrix and an initial bias vector of a fully connected layer.

A second acquisition module 602 is configured to acquire a plurality of training images.

A feature extraction module 603 is configured to, on the convolution layer of each level, perform convolution operation and maximal pooling operation on each of the training images to obtain a first feature image of each of the training images on the convolution layer of each level by using the initial convolution kernel and initial bias matrix of the convolution layer of each level.

A horizontal pooling module 604 is configured to perform horizontal pooling operation on the first feature image of each of the training images on the convolution layer of at least one of the levels to obtain a second feature image of each of the training images on the convolution layer of each level.

A first determination module 605 is configured to determine a feature vector of each of the training images according to the second feature image of each of the training images on the convolution layer of each level.

A processing module 606 is configured to process each feature vector to obtain a classification probability vector of each of the training images according to the initial weight matrixes and the initial bias vectors.

A calculation module 607 is configured to calculate a classification error according to the classification probability vector and initial classification of each of the training images.

A regulation module 608 is configured to regulate the model parameters of the CNN model to be trained on the basis of the classification errors.

An iteration module 609 is configured to continue the process of regulating the model parameters on the basis of the regulated model parameters and the plurality of training images until the number of iterations reaches a preset number.

A second determination module 610 is configured to determine model parameters obtained when the number of iterations reaches the preset number as the model parameters of the trained CNN model.

According to the device provided by the embodiment of the present disclosure, after the convolution operation and the maximal pooling operation are performed on the training images on the convolution layer of each level, the horizontal pooling operation is further performed on the feature images obtained by the maximal cooling operation. During the horizontal cooling operation, the feature images which identify features of the feature images in a horizontal direction may further be extracted from the feature images to ensure that the trained CNN model may break limits of a size of an image to be recognized in the horizontal direction during image classification identification and recognize an image to be recognized with any size, so that an image recognition application range of the CNN model trained in such a manner is relatively wider.

In another embodiment, the second acquisition module 602 includes the following units.

A first acquisition unit is configured to acquire a plurality of initial training images.

A first processing unit is configured to, for each of the initial training images, keep a width-height ratio of the initial training image, and process the initial training image to obtain a first image with a specified height.

A second processing unit is configured to process the first image to obtain a second image with a specified width.

A first determination unit is configured to determine the image with the specified height and the specified width as the training image corresponding to the initial training image.

In another embodiment, the second acquisition module 602 includes the following units.

A second acquisition unit is configured to acquire a plurality of initial training images.

A third processing unit is configured to, for each of the initial training images, keep a width-height ratio of the initial training image, process the initial training image to obtain an image with a specified height, and determine a width corresponding to the specified height as the width of the initial training image.

In another embodiment, the first processing unit includes the following subunits.

A processing subunit is configured to process each initial training image into the images with the specified height to obtain an initial width.

A filling subunit is configured to, when the initial width is smaller than the specified width, uniformly fill left and right sides of the processed initial training images with pixels having a specified gray-scale value until the initial width reaches the specified width.

A cropping subunit is configured to, when the initial width is larger than the specified width, uniformly crop pixels on the left and right sides of the processed initial training images until the initial width reaches the specified width.

In another embodiment, the feature extraction module 603 includes the following units.

A convolution unit is configured to, for each of the training images, input the first feature image on the convolution layer of a previous level to a current convolution layer, and perform the convolution operation on the first feature image on the convolution layer of the previous level to obtain a convolutional image on the current convolution layer by using the initial convolution kernel and initial bias matrix of the current convolution layer, wherein the first feature image on the convolution layer of the previous level is the training image if the current convolution layer is the convolution layer of the first level.

A maximal pooling unit is configured to perform the maximal pooling operation on the convolutional image on the current convolution layer to obtain the first feature image of the training image on the current convolution layer.

A transmission unit is configured to continue transmitting the first feature image on the current convolution layer to the convolution layer of a next level, and perform the convolution operation and the maximal pooling operation on the convolution layer of the next level until the convolution operation and the maximal pooling operation are performed on the convolution layer of a last level to obtain the first feature image on the convolution layer of the last level.

In another embodiment, the horizontal pooling module 604 includes the following units.

An extraction unit is configured to, for the first feature image of each training image on the convolution layer of each level, extract a maximum value of elements of each of rows of each of the images in the first feature image on the convolution layer, wherein the first feature image includes a preset number of images, and the preset number is the same as each of the numbers of the convolution kernels and bias matrixes of the convolution layer.

An arrangement unit is configured to arrange the maximum values extracted from all the rows of each image into a one-dimensional vector according to arrangement of pixels of each image.

A combination unit is configured to combine the one-dimensional vectors of all the images in the first feature image on the convolution layer to obtain the second feature image on the convolution layer.

In another embodiment, the first determination module 605 is configured to, for each of the training images, connect elements of all rows of the second feature image of the training image on the convolution layer of each level head to tail to obtain the feature vector of the training image.

In another embodiment, the calculation module 607 includes the following unit.

An acquisition unit is configured to acquire initial classifications of each of the training images.

A first calculation unit is configured to calculate the classification error of each of the training images according to classification probability vector and the initial classification of each of the training images by using the following formula:

$$Loss = -Ln y_{label},$$

where Loss represents the classification error of each of the training images, label represents the initial classification of each of the training images, $y_i$ represents a element of the classification probability vector of each of the training images, and $y_{label}$ represents a classification probability corresponding to the initial classification.

A second calculation unit is configured to calculate a mean of the classification errors of all the training images, and determine the mean of the classification errors as a classification error.

In another embodiment, the training images are images in a natural scene, the images in the natural scene include characters in different languages, and the CNN model to be trained is a language recognition classifier.

In another embodiment, the CNN model to be trained includes four levels of convolution layers and two fully connected layers, and the convolution layers of the respective levels include the same or different numbers of convolution kernels and bias matrixes.

In said another embodiments, the horizontal pooling module is configured to perform the horizontal pooling operation on the first feature image of each of the training images on the convolution layer of the second level, the first feature image of each of the training images on the convolution layer of the third level and the first feature image of each of the training images on the convolution layer of the fourth level to obtain the second feature image of each of the training images on the convolution layer of the second level, the second feature image of each of the training images on the convolution layer of the third level and the second feature image of each of the training images on the convolution layer of the fourth level, respectively.

In said another embodiments, the first determination module is configured to, for each of the training images, determine the feature vector of the training image according to the second feature image of the training image on the convolution layer of the second level, the second feature image of the training image on the convolution layer of the third level and the second feature image of the training image on the convolution layer of the fourth level.

All of the optional technical solutions may be freely combined into optional embodiments of the present disclosure, which will not be elaborated one by one.

Figure 7:
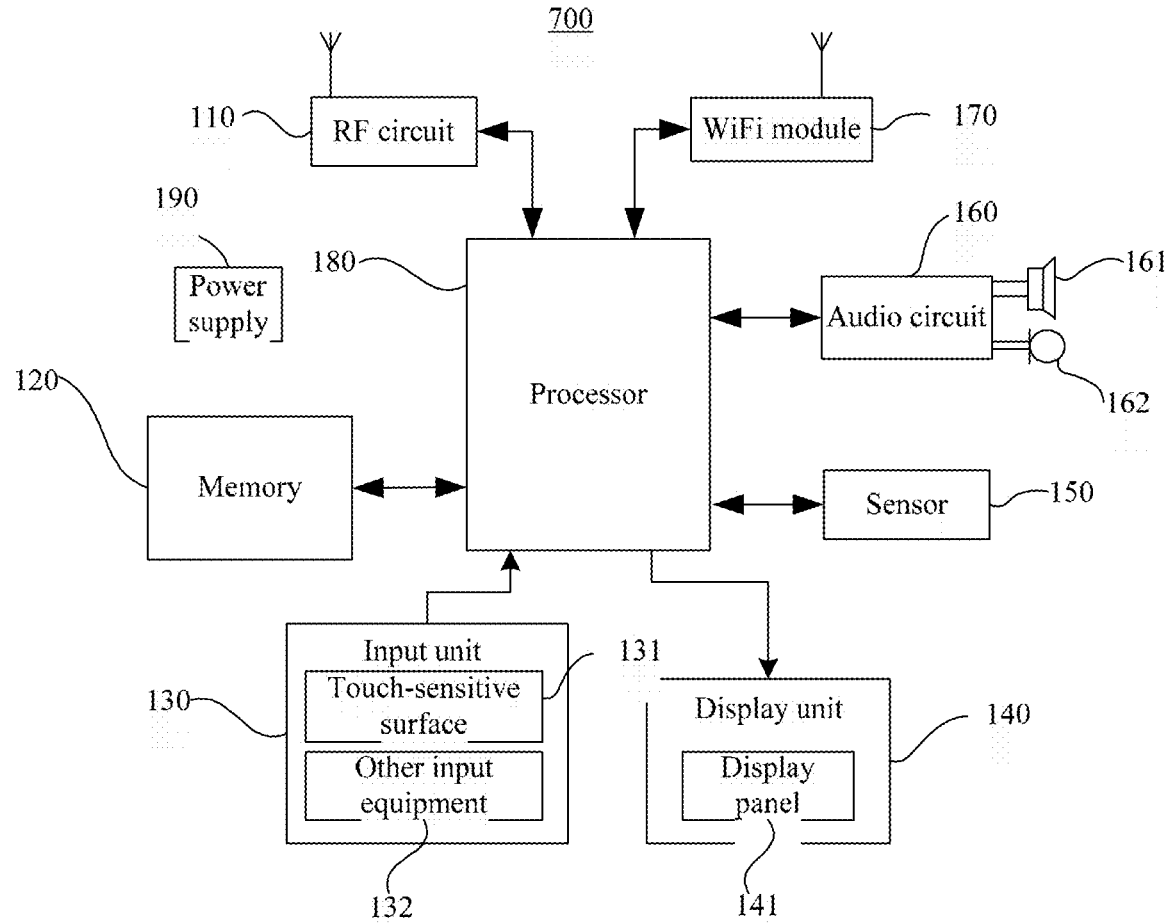
FIG. 7 is a schematic diagram of a structure of a terminal, according to another embodiment of the present disclosure.

FIG. 7 shows a schematic diagram of a structure of a terminal involved in an embodiment of the present disclosure, and the terminal may be configured to implement the method for training the CNN model provided by the embodiment corresponding to FIG. 1, FIG. 2 or FIG. 4. Details of the terminal is as follows.

The terminal 700 may include parts such as a Radio Frequency (RF) circuit 110, a memory 120 including one or more computer-readable storage medium, an input unit 130, a display unit 140, a sensor 150, an audio circuit 160, a Wireless Fidelity (WiFi) module 170, a processor 180 including one or more processing cores and a power supply 190. Those skilled in the art should know that the terminal structure shown in FIG. 7 is not intended to form limits to the terminal, and may include more or fewer parts than those shown in the figure, or some parts may be combined, or the parts may be arranged in different manners.

The RF circuit 110 may be configured to receive and send a signal in an information transmission and receiving or communication process, particularly transmit downlink information of a base station to one or more than one processor 180 for processing after receiving it, and also send involved uplink data to the base station. Usually, the RF circuit 110 includes, but not limited to, an antenna, at least one amplifier, a tuner, one or more oscillators, a Subscriber Identity Module (SIM) card, a transceiver, a coupler, a Low Noise Amplifier (LNA), a duplexer and the like. In addition, the RF circuit 110 may further communicate with a network and other equipment in a wireless communication manner. Wireless communication may adopt any communication standard or protocol, including, but not limited to, Global System of Mobile Communication (GSM), General Packet Radio Service (GPRS), Code Division Multiple Access (CDMA), Wideband Code Division Multiple Access (WCDMA), Long Term Evolution (LTE), electronic mail, Short Messaging Service (SMS) and the like.

The memory 120 may be configured to store software programs and modules, and the processor 180 runs the software programs and modules stored in the memory 120, thereby executing various function applications and data processing. The memory 120 may mainly include a program storage area and a data storage area, wherein the program storage area may store operating systems, application programs required by at least one function (such as a sound play function and an image play function) and the like; and the data storage area may store data (such as audio data and a telephone book) created by use of the terminal 700 and the like. In addition, the memory 120 may include a high speed random access memory, and may also include a nonvolatile memory, such as at least one disk memory, a flash memory or another volatile solid state memory. Correspondingly, the memory 120 may further include a memory controller for providing access to the memory 120 for the processor 180 and the input unit 130.

The input unit 130 may be configured to receive input digital or character information and generate keyboard, mouse, operating rod, optical or trackball signal input related to user setting and function control. Specifically, the input unit 130 may include a touch-sensitive surface 131 and other input equipment 132. The touch-sensitive surface 131, also called a touch display screen or a touchpad, may collect touch operation of a user thereon or nearby (such as operation of the user executed on the touch-sensitive surface 131 or nearby the touch-sensitive surface 131 by using any proper object such as a finger and a stylus) and drive a corresponding connecting device according to a preset program. Optionally, the touch-sensitive surface 131 may include two parts, i.e. a touch detection device and a touch controller, wherein the touch detection device detects a touch direction of the user, detects a signal generated by the touch operation, and sends the signal to the touch controller; and the touch controller receives touch information from the touch detection device, converts it into a touch coordinate for sending to the processor 180, and may receive and execute a command sent by the processor 180. In addition, the touch-sensitive surface 131 may be implemented by adopting a resistor, a capacitor, infrared rays, surface acoustic waves and the like. Besides the touch-sensitive surface 131, the input unit 130 may further include the other input equipment 132. Specifically, the other input equipment 132 may include, but not limited to, one or more of a physical keyboard, a function key (such as a volume control key and an on/off key), a trackball, a mouse, an operating rod and the like.

The display unit 140 may be configured to display information input by the user or information provided for the user and various graphic user interfaces of the terminal 700, and these graphic user interfaces may be formed by graphics, texts, icons, videos and any combinations thereof. The display unit 140 may include a display panel 141, and the display panel 141 may be optionally configured in form of Liquid Crystal Display (LCD), Organic Light-Emitting Diode (OLED) and the like. Furthermore, the touch-sensitive surface 131 may cover the display panel 141, the touch operation on or nearby the touch-sensitive surface 131 is sent to the processor 180 to determine a classification of a touch event after being detected, and then the processor 180 provides corresponding visual output on the display panel 141 according to the classification of the touch event. Although the touch-sensitive surface 131 and display panel 141 in FIG. 7 realize input and output functions as two independent parts, the touch-sensitive surface 131 and the display panel 141 may be integrated to realize the input and output functions in some embodiments.

The terminal 700 may further include at least one sensor 150, such as a light sensor, a motion sensor and another sensor. Specifically, the light sensor may include an ambient light sensor and a proximity sensor, wherein the ambient light sensor may regulate luminance of the display panel 141 according to brightness of ambient light, and the proximity sensor may turn off the display panel 141 and/or backlight when the terminal 700 moves to an ear. As a motion sensor, a gravity acceleration sensor may detect a magnitude of acceleration in each direction (usually three axes), may detect a magnitude and direction of gravity under a still condition, and may be configured to identify a state application of the terminal (such as horizontal and vertical screen switching, a related game and magnetometer state calibration), a vibration identification related function (such as a pedometer and knocking) and the like; and the other sensor, such as a gyroscope, an air pressure gauge, a hygrometer, a thermometer and an infrared sensor, which may be configured in the terminal 700 will not be elaborated herein.

The audio circuit 160, a loudspeaker 161 and a microphone 162 may provide an audio interface between the user and the terminal 700. The audio circuit 160 may transmit an electric signal converted from received audio data to the loudspeaker 161, and the loudspeaker 161 converts the electric signal into a sound signal for output; and on the other hand, the microphone 162 converts a collected sound signal into an electric signal, the audio circuit 160 receives and converts the electric signal into audio data, outputs the audio data to the processor 180 processing, and sends the audio data to, for example, another terminal through the RF circuit 110, or outputs the audio data to the memory 120 for further processing. The audio circuit 160 may further include an earplug hole for providing communication between an external earphone and the terminal 700.

WiFi belongs to a short-distance wireless transmission technology, the terminal 700 may help the user to send and receive electronic mails, browse web pages, access streaming media and the like through the WiFi module 170, and it provides wireless wideband Internet access for the user. Although the WiFi module 170 is shown in FIG. 7, it may be understood that it is not a necessary component of the terminal 700 and may completely be eliminated without changing the scope of the nature of the present disclosure according to a requirement.

The processor 180, as a control center of the terminal 700, connects each part of the whole terminal by using various interfaces and lines, and executes various functions and data processing of the terminal 700 by running or executing the software programs and/or modules stored in the memory 120 and calling the data stored in the memory 120, thereby monitoring the whole terminal. Optionally, the processor 180 may include one or more processing cores; and preferably, the processor 180 may integrate an application processor and a modulation and demodulation processor, wherein the application processor mainly processes an operating system, a user interface, an application program and the like, and the modulation and demodulation processor mainly processes wireless communication. It may be understood that the modulation and demodulation processor may also not be integrated into the processor 180.

The terminal 700 further includes the power supply 190 (such as a battery) for supplying power to each part, and optionally, the power supply may be logically connected with the processor 180 through a power management system, thereby realizing functions of charging and discharging management, power consumption management and the like through the power management system. The power supply 190 may further include one or more than one direct current or alternating current power supply, rechargeable system, power failure detection circuit, power converter or inverter, power state indicator and the like.

Although not being shown, the terminal 700 may further include a camera, a Bluetooth module and the like, which will not be elaborated herein. Specifically, in the embodiment, the display unit of the terminal is a touch screen display, and the terminal further includes the memory and one or more than one program, wherein the one or more than one program is stored in the memory, and is configured to be executed by one or more than one processor. The one or more than one program includes instructions configured to execute the following operations:

initial model parameters of a CNN model to be trained are acquired, wherein the initial model parameters include initial convolution kernels and initial bias matrixes of convolution layers of respective levels, and an initial weight matrix and an initial bias vector of a fully connected layer;

a plurality of training images are acquired;

on the convolution layer of each level, convolution operation and maximal pooling operation are performed on each of the training images to obtain a first feature image of each of the training images on the convolution layer of each level by using the initial convolution kernel and initial bias matrix of the convolution layer of each level;

horizontal pooling operation is performed on the first feature image of each of the training images on the convolution layer of at least one of the levels to obtain a second feature image of each of the training images on the convolution layer of each level;

a feature vector of each of the training images are determined according to the second feature image of each of the training images on the convolution layer of each level;

each feature vector is processed to obtain a classification probability vector of each of the training images according to the initial weight matrixes and the initial bias vectors;

a classification errors is calculated according to the classification probability vector and initial classification of each of the training images;

the model parameters of the CNN model to be trained are regulated on the basis of the classification errors;

the process of regulating the model parameters is continued on the basis of the regulated model parameters and the plurality of training images until the number of iterations reaches a preset number; and model parameters obtained when the number of iterations reaches the preset number are determined as the model parameters of the trained CNN model.

If the above is a first possible implementation, in a second possible implementation provided on the basis of the first possible implementation, the memory of the terminal further includes instructions configured to execute the following operation that the plurality of training images are acquired which includes:

a plurality of initial training images are acquired;

for each of the initial training images, a width-height ratio of the initial training image is kept, and the initial training image is processed to obtain a first image with a specified height; and the first image is processed to obtain a second image with a specified width, and the image with the specified height and the specified width is determined as the training image corresponding to the initial training image.

In a third possible implementation provided on the basis of the first possible implementation, the memory of the terminal further includes instructions configured to execute the following operation that the plurality of training images are acquired which includes:

a plurality of initial training images are acquired; and for each of the initial training images, a width-height ratio of the initial training image is kept, the initial training image is processed to obtain an image with a specified height, and a width corresponding to the specified height is determined as width of the initial training image.

In a fourth possible implementation provided on the basis of the second possible implementation, the memory of the terminal further includes instructions configured to execute the following operation that the first image is processed to obtain the second image with the specified width which includes:

when the width of the first image is smaller than the specified width, left and right sides of the first image are uniformly filled with pixels having a specified gray-scale value, and the second image is obtained when the width of the first image reaches the specified width; and when the width of the first image is larger than the specified width, pixels on the left and right sides of the first image are uniformly cropped, and the second image is obtained when the width of the first image reaches the specified width.

In a fifth possible implementation provided on the basis of the first possible implementation, the memory of the terminal further includes instructions configured to execute the following operation that the convolution operation and the maximal pooling operation are performed on each of the training images to obtain the first feature image of each of the training images on the convolution layer of each level by using the initial convolution kernel and initial bias matrix on the convolution layer of each level which includes:

for each of the training images, the first feature image on the convolution layer of a previous level is input to a current convolution layer, and the convolution operation is performed on the first feature image on the convolution layer of the previous level to obtain a convolutional image on the current convolution layer by using the initial convolution kernel and initial bias matrix of the current convolution layer, wherein the first feature image on the convolution layer of the previous level is the training image if the current convolution layer is the convolution layer of the first level; and after the maximal pooling operation is performed on the convolutional image on the current convolution layer to obtain the first feature image of the training image on the current convolution layer, the first feature image on the current convolution layer is continuously transmitted to the convolution layer of a next level, and the convolution operation and the maximal pooling operation are performed on the convolution layer of the next level until the convolution operation and the maximal pooling operation are performed on the convolution layer of a last level to obtain the first feature image on the convolution layer of the last level.

In a sixth possible implementation provided on the basis of the first possible implementation, the memory of the terminal further includes instructions configured to execute the following operation that the horizontal pooling operation is performed on the first feature image of each of the training images on the convolution layer of at least one of the levels to obtain the second feature image of each of the training images on the convolution layer of each level which includes:

for the first feature image of each of the training images on the convolution layer of each level, a maximum value of elements of each of rows of each of the images in the first feature image on the convolution layer are extracted, wherein the first feature image includes a preset number of images, and the preset number is the same as each of the numbers of the convolution kernels and bias matrixes of the convolution layer;

the maximum values extracted from all the rows of each image are arranged into a one-dimensional vector according to arrangement of pixels of each image; and the one-dimensional vectors of all the images in the first feature image on the convolution layer are combined to obtain the second feature image on the convolution layer.

In a seventh possible implementation provided on the basis of the sixth possible implementation, the memory of the terminal further includes instructions configured to execute the following operation that the feature vector of each of the training images are determined according to the second feature image of each of the training images on the convolution layer of each level which includes:

for each of the training images, elements of all rows of the second feature image of the training image on the convolution layer of each level are connected head to tail to obtain the feature vector of the training image.

In an eighth possible implementation provided on the basis of the first possible implementation, the memory of the terminal further includes instructions configured to execute the following operation that the classification error is calculated according to the classification probability vector and initial classification of each of the training images which includes:

the initial classification of each of the training images are acquired;

the classification error of each of the training images is calculated according to the classification probability vector and initial classification of each of the training images by using the following formula:

$$Loss = -Lny_{label},$$

where Loss represents the classification error of each of the training images, label represents the initial classification of each of the training images, $y_i$ represents a element of the classification probability vector of each of the training images, and $y_{label}$ represents a classification probability corresponding to the initial classification; and a mean of the classification errors of all the training images is calculated, and the mean of the classification errors is determined as a classification error.

In a ninth possible implementation provided on the basis of any one of the first to eighth possible implementations, the training images are images in a natural scene, the images in the natural scene include characters in different languages, and the CNN model to be trained is a language recognition classifier.

In a tenth possible implementation provided on the basis of any one of the first to eighth possible implementations, the CNN model to be trained includes four levels of convolution layers and two fully connected layers, and the convolution layers of the respective levels include the same or different numbers of convolution kernels and bias matrixes, the memory of the terminal further includes instructions configured to execute the following operation:

the operation that the horizontal pooling operation is performed on the first feature image of each of the training images on the convolution layer of at least one of the levels to obtain the second feature image of each of the training images on the convolution layer of each level including:

the horizontal pooling operation is performed on the first feature image of each of the training images on the convolution layer of a second level, the first feature image of each of the training images on the convolution layer of a third level and the first feature image of each of the training images on the convolution layer of a fourth level to obtain the second feature image of each of the training images on the convolution layer of the second level, the second feature image of each of the training images on the convolution layer of the third level and the second feature image of each of the training images on the convolution layer of the fourth level, respectively; and the operation that the feature vector of each of the training images are determined according to the second feature image of each of the training images on the convolution layer of each level including:

for each of the training images, the feature vector of the training image are determined according to the second feature image of the training image on the convolution layer of the second level, the second feature image of the training image on the convolution layer of the third level and the second feature image of the training image on the convolution layer of the fourth level.

According to the terminal provided by the embodiment of the present disclosure, after the convolution operation and the maximal pooling operation are performed on the training images on the convolution layer of each level, the horizontal pooling operation is further performed on the feature images obtained by the maximal cooling operation. During the horizontal cooling operation, the feature images which identify features of the feature images in a horizontal direction may further be extracted from the feature images to ensure that the trained CNN model may break limits of a size of an image to be recognized in the horizontal direction during image classification identification and recognize an image to be recognized with any size, so that an image recognition application range of the CNN model trained in such a manner is relatively wider.

The embodiment of the present disclosure provides a computer-readable storage medium, which may be a computer-readable storage medium included in a memory in the abovementioned embodiment, and may also be a computer-readable storage medium existing independently and unassembled in a terminal. The computer-readable storage medium stores one or more than one program, and the one or more than one program is configured for one or more than one processor to execute a method for training a CNN model, the method including:

initial model parameters of a CNN model to be trained are acquired, wherein the initial model parameters include initial convolution kernels and initial bias matrixes of convolution layers of respective levels, and an initial weight matrix and an initial bias vector of a fully connected layer;

a plurality of training images are acquired;

on the convolution layer of each level, convolution operation and maximal pooling operation are performed on each of the training images to obtain a first feature image of each of the training images on the convolution layer of each level by using the initial convolution kernel and initial bias matrix of the convolution layer of each level;

horizontal pooling operation is performed on the first feature image of each of the training images on the convolution layer of at least one of the levels to obtain a second feature image of each of the training images on the convolution layer of each level;

a feature vector of each of the training images are determined according to the second feature image of each of the training images on the convolution layer of each level;

each feature vector is processed to obtain a classification probability vector of each of the training images according to the initial weight matrixes and the initial bias vectors;

a classification error is calculated according to the classification probability vector and initial classification of each of the training images;

the model parameters of the CNN model to be trained are regulated on the basis of the classification errors;

the process of regulating the model parameters is continued on the basis of the regulated model parameters and the plurality of training images until the number of iterations reaches a preset number; and model parameters obtained when the number of iterations reaches the preset number are determined as the model parameters of the trained CNN model.

If the above is a first possible implementation, in a second possible implementation provided on the basis of the first possible implementation, the memory of the terminal further includes instructions configured to execute the following operation that the plurality of training images are acquired which includes:

a plurality of initial training images are acquired;

for each of the initial training images, a width-height ratio of the initial training image is kept, and the initial training image is processed to obtain a first image with a specified height; and the first image is processed to obtain a second image with a specified width, and the image with the specified height and the specified width is determined as the training image corresponding to the initial training image.

In a third possible implementation provided on the basis of the first possible implementation, the memory of the terminal further includes instructions configured to execute the following operation that the plurality of training images are acquired which includes:

a plurality of initial training images are acquired; and for each of the initial training images, a width-height ratio of the initial training image is kept, the initial training image is processed to obtain an image with a specified height, and a width corresponding to the specified height is determined as width of the initial training image.

In a fourth possible implementation provided on the basis of the second possible implementation, the memory of the terminal further includes instructions configured to execute the following operation that the first image is processed to obtain the second image with the specified width which includes:

when the width of the first image is smaller than the specified width, left and right sides of the first image are uniformly filled with pixels having a specified gray-scale value, and the second image is obtained when the width of the first image reaches the specified width; and when the width of the first image is larger than the specified width, pixels on the left and right sides of the first image are uniformly cropped, and the second image is obtained when the width of the first image reaches the specified width.

In a fifth possible implementation provided on the basis of the first possible implementation, the memory of the terminal further includes instructions configured to execute the following operation that the convolution operation and the maximal pooling operation are performed on each of the training images to obtain the first feature image of each of the training images on the convolution layer of each level by using the initial convolution kernel and initial bias matrix on the convolution layer of each level which includes:

for each of the training images, the first feature image on the convolution layer of a previous level is input to a current convolution layer, and the convolution operation is performed on the first feature image on the convolution layer of the previous level to obtain a convolutional image on the current convolution layer by using the initial convolution kernel and initial bias matrix of the current convolution layer, wherein the first feature image on the convolution layer of the previous level is the training image if the current convolution layer is the convolution layer of the first level; and after the maximal pooling operation is performed on the convolutional image on the current convolution layer to obtain the first feature image of the training image on the current convolution layer, the first feature image on the current convolution layer is continuously transmitted to the convolution layer of a next level, and the convolution operation and the maximal pooling operation are performed on the convolution layer of the next level until the convolution operation and the maximal pooling operation are performed on the convolution layer of a last level to obtain the first feature image on the convolution layer of the last level.

In a sixth possible implementation provided on the basis of the first possible implementation, the memory of the terminal further includes instructions configured to execute the following operation that the horizontal pooling operation is performed on the first feature image of each of the training images on the convolution layer of at least one of the levels to obtain the second feature image of each of the training images on the convolution layer of each level which includes:

for the first feature image of each training image on the convolution layer of each level, a maximum value of elements of each of rows of each of the images in the first feature image on the convolution layer are extracted, wherein the first feature image includes a preset number of images, and the preset number is the same as each of the numbers of the convolution kernels and bias matrixes of the convolution layer;

the maximum values extracted from all the rows of each image are arranged into a one-dimensional vector according to arrangement of pixels of each image; and the one-dimensional vectors of all the images in the first feature image on the convolution layer are combined to obtain the second feature image on the convolution layer.

In a seventh possible implementation provided on the basis of the sixth possible implementation, the memory of the terminal further includes instructions configured to execute the following operation that the feature vector of each of the training images are determined according to the second feature image of each of the training images on the convolution layer of each level which includes:

for each of the training images, elements of all rows of the second feature image of the training image on the convolution layer of each level are connected head to tail to obtain the feature vector of the training image.

In an eighth possible implementation provided on the basis of the first possible implementation, the memory of the terminal further includes instructions configured to execute the following operation that the classification error is calculated according to the classification probability vector and initial classification of each of the training images which includes:

the initial classification of each of the training images are acquired;

the classification error of each of the training images is calculated according to the classification probability vector and initial classification of each of the training images by using the following formula:

$$\text{Loss} = -Lny_{label},$$

where Loss represents the classification error of each of the training images, label represents the initial classification of each of the training images, $y_i$ represents a element of the classification probability vector of each of the training images, and $y_{label}$ represents a classification probability corresponding to the initial classification; and a mean of the classification errors of all the training images is calculated, and the mean of the classification errors is determined as a classification error.

In a ninth possible implementation provided on the basis of any one of the first to eighth possible implementations, the training images are images in a natural scene, the images in the natural scene include characters in different languages, and the CNN model to be trained is a language recognition classifier.

In a tenth possible implementation provided on the basis of any one of the first to eighth possible implementations, the CNN model to be trained includes four levels of convolution layers and two fully connected layers, and the convolution layers of the respective levels include the same or different numbers of convolution kernels and bias matrixes the memory of the terminal further includes instructions configured to execute the following operation:

the operation that the horizontal pooling operation is performed on the first feature image of each of the training images on the convolution layer of at least one of the levels to obtain the second feature image of each of the training images on the convolution layer of each level including:

the horizontal pooling operation is performed on the first feature image of each of the training images on the convolution layer of a second level, the first feature image of each of the training images on the convolution layer of a third level and the first feature image of each of the training images on the convolution layer of a fourth level to obtain the second feature image of each of the training images on the convolution layer of the second level, the second feature image of each of the training images on the convolution layer of the third level and the second feature image of each of the training images on the convolution layer of the fourth level, respectively; and the operation that the feature vector of each of the training images are determined according to the second feature image of each of the training images on the convolution layer of each level including:

for each of the training images, the feature vector of the training image are determined according to the second feature image of the training image on the convolution layer of the second level, the second feature image of the training image on the convolution layer of the third level and the second feature image of the training image on the convolution layer of the fourth level.

According to the computer-readable storage medium provided by the embodiment of the present disclosure, after the convolution operation and the maximal pooling operation are performed on the training images on the convolution layer of each level, the horizontal pooling operation is further performed on the feature images obtained by the maximal cooling operation. During the horizontal cooling operation, the feature images which identify features of the feature images in a horizontal direction may further be extracted from the feature images to ensure that the trained CNN model may break limits of a size of an image to be recognized in the horizontal direction during image classification identification and recognize an image to be recognized with any size, so that an image recognition application range of the CNN model trained in such a manner is relatively wider.

The embodiment of the present disclosure provides a graphic user interface, the graphic user interface is adopted for a terminal, the terminal includes a touch screen display, a memory and one or more than one processor configured to execute one or more than one program, and the graphic user interface includes:

initial model parameters of a CNN model to be trained are acquired, wherein the initial model parameters include initial convolution kernels and initial bias matrixes of convolution layers of respective levels, and an initial weight matrix and an initial bias vector of a fully connected layer;

a plurality of training images are acquired;

on the convolution layer of each level, convolution operation and maximal pooling operation are performed on each of the training images to obtain a first feature image of each of the training images on the convolution layer of each level by using the initial convolution kernel and initial bias matrix of the convolution layer of each level;

horizontal pooling operation is performed on the first feature image of each of the training images on the convolution layer of at least one of the levels to obtain a second feature image of each of the training images on the convolution layer of each level;

a feature vector of each of the training images are determined according to the second feature image of each of the training images on the convolution layer of each level;

each feature vector is processed to obtain a classification probability vector of each of the training images according to the initial weight matrixes and the initial bias vectors;

a classification error is calculated according to the classification probability vector and initial classification of each of the training images;

the model parameters of the CNN model to be trained are regulated on the basis of the classification errors;

the process of regulating the model parameters is continued on the basis of the regulated model parameters and the plurality of training images until the number of iterations reaches a preset number; and model parameters obtained when the number of iterations reaches the preset number are determined as the model parameters of the trained CNN model.

If the above is a first possible implementation, in a second possible implementation provided on the basis of the first possible implementation, the memory of the terminal further includes instructions configured to execute the following operation that the plurality of training images are acquired which includes:

a plurality of initial training images are acquired;

width-height ratios of each initial training image are kept, and all the initial training images are processed into first images with a specified height and a specified width to obtain the plurality of training images.

In a third possible implementation provided on the basis of the first possible implementation, the memory of the terminal further includes instructions configured to execute the following operation that the plurality of training images are acquired which includes:

a plurality of initial training images are acquired; and width-height ratios of each initial training image are kept, the initial training image is processed to obtain an image with a specified height, and a width corresponding to the specified height is determined as width of the initial training image to obtain the plurality of training images.

According to the graphic user interface provided by the embodiment of the present disclosure, after the convolution operation and the maximal pooling operation are performed on the training images on the convolution layer of each level, the horizontal pooling operation is further performed on the feature images obtained by the maximal cooling operation. During the horizontal cooling operation, the feature images which identify features of the feature images in a horizontal direction may further be extracted from the feature images to ensure that the trained CNN model may break limits of a size of an image to be recognized in the horizontal direction during image classification identification and recognize an image to be recognized with any size, so that an image recognition application range of the CNN model trained in such a manner is relatively wider.

Figure 8:
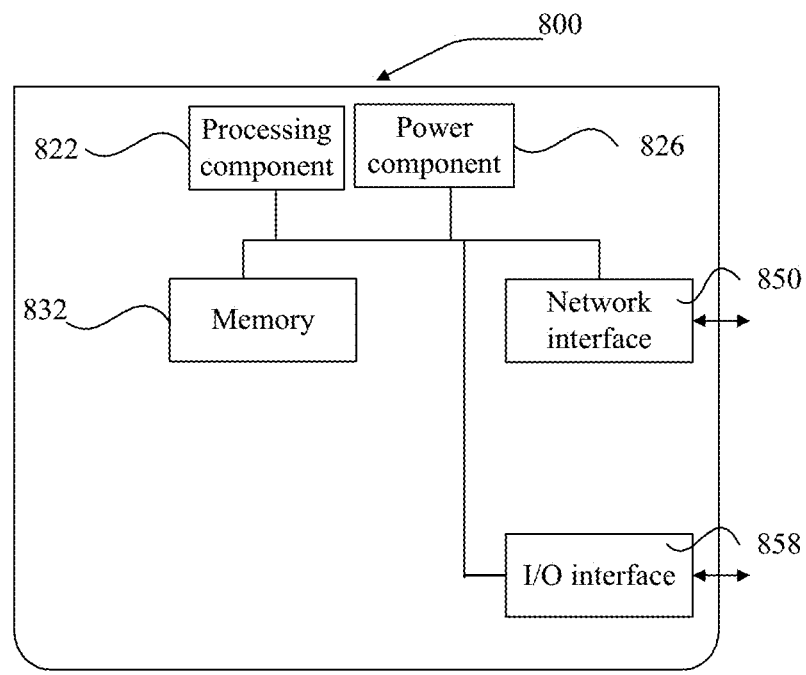
FIG. 8 is a schematic diagram of a structure of a server, according to another embodiment of the present disclosure.

The method for training the CNN model provided by the embodiment corresponding to any one of FIG. 1, FIG. 2 and FIGS. 5A-5B may also be executed by a server. FIG. 8 is a schematic diagram of a structure of a server, according to an exemplary embodiment, and the server may be configured to execute the method for training the CNN model provided by the embodiment corresponding to any one of FIG. 1, FIG. 2 and FIGS. 5A-5B. Referring to FIG. 8, the server 800 includes a processing component 822, which further includes one or more processors, and a memory resource represented by a memory 832, configured to store instructions, such as application programs, executable for the processing component 822. The application programs stored in the memory 832 may include one or more than one module of which each corresponds to a set of instructions. In addition, the processing component 822 is configured to execute the instructions, so as to execute the method for training the CNN model provided by the embodiment corresponding to any one of FIG. 1, FIG. 2 and FIGS. 5A-5B.

The server 800 may further include a power component 828 configured to execute power management of the server 800, a wired or wireless network interface 850 configured to connect the server 800 to a network, and an Input/Output (I/O) interface 858. The server 800 may be operated on the basis of an operating system stored in the memory 832, such as Windows Server™, Mac OS X™, Unix™, Linux™ and FreeBSD™.

Wherein, one or more programs is/are stored in the memory, and is/are configured to be executed by one or more processors, and the one or more programs includes/include instructions configured to perform the following operations:

initial model parameters of a CNN model to be trained are acquired, wherein the initial model parameters include initial convolution kernels and initial bias matrixes of convolution layers of respective levels, and an initial weight matrix and an initial bias vector of a fully connected layer;

a plurality of training images are acquired;

on the convolution layer of each level, convolution operation and maximal pooling operation are performed on each of the training images to obtain a first feature image of each of the training images on the convolution layer of each level by using the initial convolution kernel and initial bias matrix of the convolution layer of each level;

horizontal pooling operation is performed on the first feature image of each of the training images on the convolution layer of at least one of the levels to obtain a second feature image of each of the training images on the convolution layer of each level;

a feature vector of each of the training images are determined according to the second feature image of each of the training images on the convolution layer of each level;

each feature vector is processed to obtain a classification probability vector of each of the training images according to the initial weight matrixes and the initial bias vectors;

a classification error is calculated according to the classification probability vector and initial classification of each of the training images;

the model parameters of the CNN model to be trained are regulated on the basis of the classification errors;

the process of regulating the model parameters is continued on the basis of the regulated model parameters and the plurality of training images until the number of iterations reaches a preset number; and model parameters obtained when the number of iterations reaches the preset number are determined as the model parameters of the trained CNN model.

If the above is a first possible implementation, in a second possible implementation provided on the basis of the first possible implementation, the memory of the server further includes instructions configured to execute the following operation that the plurality of training images are acquired which includes:

a plurality of initial training images are acquired;

for each of the initial training images, a width-height ratio of the initial training image is kept, and the initial training image is processed to obtain a first image with a specified height; and the first image is processed to obtain a second image with a specified width, and the image with the specified height and the specified width is determined as the training image corresponding to the initial training image.

In a third possible implementation provided on the basis of the first possible implementation, the memory of the server further includes instructions configured to execute the following operation that the plurality of training images are acquired includes:

a plurality of initial training images are acquired; and for each of the initial training images, a width-height ratio of the initial training image is kept, the initial training image is processed to obtain an image with a specified height, and a width corresponding to the specified height is determined as width of the initial training image.

In a fourth possible implementation provided on the basis of the second possible implementation, the memory of the server further includes instructions configured to execute the following operation that the first image is processed to obtain the second image with the specified width which includes:

when the width of the first image is smaller than the specified width, left and right sides of the first image are uniformly filled with pixels having a specified gray-scale value, and the second image is obtained when the width of the first image reaches the specified width; and when the width of the first image is larger than the specified width, pixels on the left and right sides of the first image are uniformly cropped, and the second image is obtained when the width of the first image reaches the specified width.

In a fifth possible implementation provided on the basis of the first possible implementation, the memory of the server further includes instructions configured to execute the following operation that the convolution operation and the maximal pooling operation are performed on each of the training images to obtain the first feature image of each of the training images on the convolution layer of each level by using the initial convolution kernel and initial bias matrix on the convolution layer of each level which includes:

for each of the training images, the first feature image on the convolution layer of a previous level is input to a current convolution layer, and the convolution operation is performed on the first feature image on the convolution layer of the previous level to obtain a convolutional image on the current convolution layer by using the initial convolution kernel and initial bias matrix of the current convolution layer, wherein the first feature image on the convolution layer of the previous level is the training image if the current convolution layer is the convolution layer of the first level; and after the maximal pooling operation is performed on the convolutional image on the current convolution layer to obtain the first feature image of the training image on the current convolution layer, the first feature image on the current convolution layer is continuously transmitted to the convolution layer of a next level, and the convolution operation and the maximal pooling operation are performed on the convolution layer of the next level until the convolution operation and the maximal pooling operation are performed on the convolution layer of a last level to obtain the first feature image on the convolution layer of the last level.

In a sixth possible implementation provided on the basis of the first possible implementation, the memory of the server further includes instructions configured to execute the following operation that the horizontal pooling operation is performed on the first feature image of each of the training images on the convolution layer of at least one of the levels to obtain the second feature image of each of the training images on the convolution layer of each level which includes:

for the first feature image of each training image on the convolution layer of each level, a maximum value of elements of each of rows of each of the images in the first feature image on the convolution layer are extracted, wherein the first feature image includes a preset number of images, and the preset number is the same as each of the numbers of the convolution kernels and bias matrixes of the convolution layer;

the maximum values extracted from all the rows of each image are arranged into a one-dimensional vector according to arrangement of pixels of each image; and the one-dimensional vectors of all the images in the first feature image on the convolution layer are combined to obtain the second feature image on the convolution layer.

In a seventh possible implementation provided on the basis of the sixth possible implementation, the memory of the server further includes instructions configured to execute the following operation that the feature vector of each of the training images are determined according to the second feature image of each of the training images on the convolution layer of each level which includes:

for each of the training images, elements of all rows of the second feature image of the training image on the convolution layer of each level are connected head to tail to obtain the feature vector of the training image.

In an eighth possible implementation provided on the basis of the first possible implementation, the memory of the server further includes instructions configured to execute the following operation that the classification error is calculated according to the classification probability vector and initial classification of each of the training images which includes:

the initial classification of each of the training images are acquired;

the classification error of each of the training images is calculated according to the classification probability vector and initial classification of each of the training images by using the following formula:

$$\mathrm{Loss} = -Lny_{label},$$

where Loss represents the classification error of each of the training images, label represents the initial classification of each of the training images, $y_i$ represents a element of the classification probability vector of each of the training images, and $y_{label}$ represents a classification probability corresponding to the initial classification; and a mean of the classification errors of all the training images is calculated, and the mean of the classification errors is determined as a classification error.

In a ninth possible implementation provided on the basis of any one of the first to eighth possible implementations, the training images are images in a natural scene, the images in the natural scene include characters in different languages, and the CNN model to be trained is a language recognition classifier.

In a tenth possible implementation provided on the basis of any one of the first to eighth possible implementations, the CNN model to be trained includes four levels of convolution layers and two fully connected layers, and the convolution layers of the respective levels include the same or different numbers of convolution kernels and bias matrixes the memory of the server further includes instructions configured to execute the following operations:

the operation that the horizontal pooling operation is performed on the first feature image of each of the training images on the convolution layer of at least one of the levels to obtain the second feature image of each of the training images on the convolution layer of each level including:

the horizontal pooling operation is performed on the first feature image of each of the training images on the convolution layer of a second level, the first feature image of each of the training images on the convolution layer of a third level and the first feature image of each of the training images on the convolution layer of a fourth level to obtain the second feature image of each of the training images on the convolution layer of the second level, the second feature image of each of the training images on the convolution layer of the third level and the second feature image of each of the training images on the convolution layer of the fourth level, respectively; and the operation that the feature vector of each of the training images are determined according to the second feature image of each of the training images on the convolution layer of each level including:

for each of the training images, the feature vector of the training image are determined according to the second feature image of the training image on the convolution layer of the second level, the second feature image of the training image on the convolution layer of the third level and the second feature image of the training image on the convolution layer of the fourth level.

According to the server provided by the embodiment of the present disclosure, after the convolution operation and the maximal pooling operation are performed on the training images on the convolution layer of each level, the horizontal pooling operation is further performed on the feature images obtained by the maximal cooling operation. During the horizontal cooling operation, the feature images which identify features of the feature images in a horizontal direction may further be extracted from the feature images to ensure that the trained CNN model may break limits of a size of an image to be recognized in the horizontal direction during image classification identification and recognize an image to be recognized with any size, so that an image recognition application range of the CNN model trained in such a manner is relatively wider.

It is to be noted that when training the CNN model, the device for training the CNN model provided by the embodiment is only described with division of each of the abovementioned functional modules as an example, and during a practical application, the abovementioned functions may be allocated to different functional modules for realization, that is, an internal structure of the device is divided into different functional modules to realize all or part of the abovementioned functions. In addition, the device, terminal and server for training the CNN model provided by the embodiment belong to the same concept with the embodiment of the method for training the CNN model, and their specific implementation processes refer to the method embodiment, and will not be elaborated herein.

Those skilled in the art may understood that all or part of the steps of the embodiment may be implemented by hardware, and may also be implemented by instructing related hardware through a program, the program may be stored in a computer-readable storage medium, and the abovementioned storage medium may be a read-only memory, a disk, a compact disc or the like.

The above is only the preferred embodiment of the present disclosure and not intended to limit the present disclosure, and any modifications, equivalent replacements, improvements and the like made within the spirit and principle of the present disclosure shall fall within the scope of protection of the present disclosure.

What is claimed is:

1. A method for training a Convolutional Neural Network (CNN) model, the method comprising:
   acquiring, by an information processing apparatus, a plurality of initial training images including characters in different languages; and
   processing, by the information processing apparatus, each of the plurality of initial training images to generate a plurality of training images, the plurality of training images including one or a combination of a plurality of first training images and a plurality of second training images for training the CNN model, wherein
   each of the plurality of first training images has a first predetermined height and a predetermined width,
   each of the plurality of second training images has a second predetermined height and a width that is determined based on the second predetermined height, and
   when the plurality of training images includes the plurality of first training images, the processing each of the plurality of initial training images includes
      processing one of the plurality of initial training images to generate an image with the first predetermined height and a width that maintains an aspect ratio of the one of the plurality of initial training images, and
      changing a number of pixels in the width of the image to the predetermined width.

2. The method according to claim 1, wherein the processing each of the plurality of initial training images comprises:
   processing, by the information processing apparatus, the plurality of initial training images to generate a plurality of images with the first predetermined height, and
   processing, by the information processing apparatus, the plurality of images to generate the plurality of first training images with the predetermined width.

3. The method according to claim 2, wherein
   the processing the plurality of images to generate the plurality of first training images with the predetermined width includes uniformly filling, by the information processing apparatus, left and right sides of the image with pixels until the width of the image reaches the predetermined width.

4. The method according to claim 2, wherein
   the processing the plurality of images to generate the plurality of first training images with the predetermined width includes uniformly cropping, by the information processing apparatus, pixels on left and right sides of the image until the width of the image reaches the predetermined width.

5. The method according to claim 1, wherein the processing each of the plurality of initial training images comprises:
processing, by the information processing apparatus, the plurality of initial training images to generate the plurality of second training images with the second predetermined height and the width that is determined based on the second predetermined height and maintains aspect ratios of the plurality of initial training images.

6. The method according to claim 1, further comprising: training the CNN model based on the generated plurality of training images.

7. The method according to claim 1, wherein
the plurality of training images are images in a natural scene, and
the CNN model to be trained is a language recognition classifier.

8. The method according to claim 1, further comprising:
acquiring, by the information processing apparatus, initial model parameters of the CNN model to be trained, the initial model parameters including initial convolution kernels and initial bias matrixes of convolution layers of respective levels, and an initial weight matrix and an initial bias vector of a fully connected layer;
on the convolution layer of each level, performing, by the information processing apparatus, convolution operation and maximal pooling operation on each of the plurality of training images to obtain a first feature image of each of the plurality of training images on the convolution layer of each level by using the initial convolution kernel and initial bias matrix of the convolution layer of each level; and
performing, by the information processing apparatus, a horizontal pooling operation on the first feature image of each of the plurality of training images on the convolution layer of at least one of the levels to obtain a second feature image of each of the plurality of training images on the convolution layer of each level.

9. The method according to claim 8 further comprising:
determining, by the information processing apparatus, a feature vector of each of the plurality of training images according to the second feature image of each of the plurality of training images on the convolution layer of each level;
processing, by the information processing apparatus, each feature vector to obtain a classification probability vector of each of the plurality of training images according to the initial weight matrixes and the initial bias vectors;
calculating, by the information processing apparatus, a classification error according to the classification probability vector and initial classification of each of the plurality of training images;
regulating, by the information processing apparatus, the model parameters of the CNN model to be trained on the basis of the classification errors;
on the basis of the regulated model parameters and the plurality of training images, continuing, by the information processing apparatus, the process of regulating the model parameters, until a number of iterations reaches a preset number; and
determining, by the information processing apparatus, model parameters obtained when the number of iterations reaches the preset number as the model parameters of the trained CNN model.

10. An information processing apparatus, comprising:
processing circuitry configured to
acquire a plurality of initial training images including characters in different languages; and
process each of the plurality of initial training images to generate a plurality of training images, the plurality of training images including one or a combination of a plurality of first training images and a plurality of second training images for training the CNN model, wherein
each of the plurality of first training images has a first predetermined height and a predetermined width,
each of the plurality of second training images has a second predetermined height and a width that is determined based on the second predetermined height, and
when the plurality of training images includes the plurality of first training images, the processing each of the plurality of initial training images includes
processing one of the plurality of initial training images to generate an image with the first predetermined height and a width that maintains an aspect ratio of the one of the plurality of initial training images, and
changing a number of pixels in the width of the image to the predetermined width.

11. The information processing apparatus according to claim 10, wherein the processing circuitry is configured to:
process the plurality of initial training images to generate a plurality of images with the first predetermined height, and
process the plurality of images to generate the plurality of first training images with the predetermined width.

12. The information processing apparatus according to claim 11, wherein the processing circuitry is configured to:
uniformly fill left and right sides of the image with pixels until the width of the image reaches the predetermined width.

13. The information processing apparatus according to claim 11, wherein the processing circuitry is configured to:
uniformly crop pixels on left and right sides of the image until the width of the image reaches the predetermined width.

14. The information processing apparatus according to claim 10, wherein the processing circuitry is configured to:
process the plurality of initial training images to generate the plurality of second training images with the second predetermined height and the width that is determined based on the second predetermined height and maintains aspect ratios of the plurality of initial training images.

15. The information processing apparatus according to claim 10, wherein the processing circuitry is configured to:
train the CNN model based on the generated plurality of training images.

16. The information processing apparatus according to claim 10, wherein
the plurality of training images are images in a natural scene, and
the CNN model to be trained is a language recognition classifier.

17. The information processing apparatus according to claim 10, wherein the processing circuitry is configured to:
acquire initial model parameters of the CNN model to be trained, the initial model parameters including initial convolution kernels and initial bias matrixes of convolution layers of respective levels, and an initial weight matrix and an initial bias vector of a fully connected layer;

on the convolution layer of each level, perform convolution operation and maximal pooling operation on each of the plurality of training images to obtain a first feature image of each of the plurality training images on the convolution layer of each level by using the initial convolution kernel and initial bias matrix of the convolution layer of each level; and perform a horizontal pooling operation on the first feature image of each of the plurality of training images on the convolution layer of at least one of the levels to obtain a second feature image of each of the plurality of training images on the convolution layer of each level.

18. The information processing apparatus according to claim 17, wherein the processing circuitry is configured to:
determine a feature vector of each of the plurality of training images according to the second feature image of each of the plurality of training images on the convolution layer of each level;
process each feature vector to obtain a classification probability vector of each of the plurality of training images according to the initial weight matrixes and the initial bias vectors;
calculate a classification error according to the classification probability vector and initial classification of each of the plurality of training images;
regulate the model parameters of the CNN model to be trained on the basis of the classification errors;
on the basis of the regulated model parameters and the plurality of training images, continue the process of regulating the model parameters, until a number of iterations reaches a preset number; and
determine model parameters obtained when the number of iterations reaches the preset number as the model parameters of the trained CNN model.

19. A non-transitory computer-readable medium storing instructions which when executed by a processor cause the processor to perform:
acquiring a plurality of initial training images including characters in different languages; and
processing each of the plurality of initial training images to generate a plurality of training images, the plurality of training images including one or a combination of a plurality of first training images and a plurality of second training images for training the CNN model, wherein each of the plurality of first training images has a first predetermined height and a predetermined width,
each of the plurality of second training images has a second predetermined height and a width that is determined based on the second predetermined height, and
when the plurality of training images includes the plurality of first training images, the processing each of the plurality of initial training images includes
processing one of the plurality of initial training images to generate an image with the first predetermined height and a width that maintains an aspect ratio of the one of the plurality of initial training images, and
changing a number of pixels in the width of the image to the predetermined width.

* * * * *